United States Patent
Muraoka et al.

(10) Patent No.: US 9,705,159 B2
(45) Date of Patent: Jul. 11, 2017

(54) METHOD FOR FABRICATING A NONAQUEOUS ELECTROLYTE SECONDARY BATTERY

(71) Applicant: PANASONIC CORPORATION, Osaka (JP)

(72) Inventors: Yoshiyuki Muraoka, Osaka (JP); Kozo Watanabe, Osaka (JP); Kaoru Inoue, Osaka (JP); Yukihiro Okada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 334 days.

(21) Appl. No.: 14/341,630

(22) Filed: Jul. 25, 2014

(65) Prior Publication Data

US 2014/0331485 A1    Nov. 13, 2014

Related U.S. Application Data

(62) Division of application No. 12/517,135, filed as application No. PCT/JP2008/002114 on Aug. 5, 2008.

(30) Foreign Application Priority Data

Aug. 9, 2007 (JP) .................................. 2007-207594
Dec. 14, 2007 (JP) .................................. 2007-323217

(51) Int. Cl.
*H01M 10/058* (2010.01)
*H01M 10/052* (2010.01)
(Continued)

(52) U.S. Cl.
CPC ........... *H01M 10/058* (2013.01); *H01M 2/14* (2013.01); *H01M 4/13* (2013.01); *H01M 4/622* (2013.01);
(Continued)

(58) Field of Classification Search
None
See application file for complete search history.

(56) References Cited

U.S. PATENT DOCUMENTS 3,639,174 A    2/1972   Kegelman
5,401,278 A    3/1995   Yasuda et al.
(Continued)

FOREIGN PATENT DOCUMENTS

CN    1633727 A    6/2005
CN    1929166 A    3/2007
(Continued)

OTHER PUBLICATIONS

Hatch, J.E.: "Aluminum Properties and Physical Metallurgy, passage", Aluminum, Properties and Physical Metallurgy, American Society for Metals, Jan. 1, 1987, pp. 224-241, Ohio.
(Continued)

*Primary Examiner* — Daniel Gatewood
(74) *Attorney, Agent, or Firm* — McDermott Will & Emery LLP

(57) ABSTRACT

A nonaqueous electrolyte secondary battery includes: a positive electrode 4 including a positive electrode current collector and a positive electrode mixture layer containing a positive electrode active material and a binder, the positive electrode mixture layer being provided on the positive electrode current collector; a negative electrode 5; a porous insulating layer 6 interposed between the positive electrode 4 and the negative electrode 5; and a nonaqueous electrolyte. The positive electrode 4 has a tensile extension percentage of equal to or higher than 3.0%. The positive electrode current collector is made of aluminum containing iron. In this manner, the tensile extension percentage of the positive electrode is increased without a decrease in capacity of the nonaqueous electrolyte secondary battery. Accordingly, even when the nonaqueous electrolyte secondary battery is (Continued)

destroyed by crush, occurrence of short-circuit in the non-aqueous electrolyte secondary battery can be suppressed.

16 Claims, 5 Drawing Sheets

(51) Int. Cl.
    *H01M 4/13*     (2010.01)
    *H01M 4/66*     (2006.01)
    *H01M 2/14*     (2006.01)
    *H01M 4/62*     (2006.01)
    *H01M 10/04*     (2006.01)
    *H01M 4/02*     (2006.01)

(52) U.S. Cl.
    CPC ............. *H01M 4/623* (2013.01); *H01M 4/66* (2013.01); *H01M 4/661* (2013.01); *H01M 10/0431* (2013.01); *H01M 10/052* (2013.01); *H01M 2004/021* (2013.01); *Y02P 70/54* (2015.11); *Y10T 29/49115* (2015.01)

(56) References Cited

U.S. PATENT DOCUMENTS

| | | | |
|---|---|---|---|
| 6,117,589 | A | 9/2000 | Satou et al. |
| 6,153,332 | A | 11/2000 | Nishida et al. |
| 6,245,272 | B1 | 6/2001 | Takita et al. |
| 2006/0141341 | A1 | 6/2006 | Nishino et al. |
| 2006/0216608 | A1* | 9/2006 | Ohata ................... H01M 2/145 |
| | | | 429/246 |

FOREIGN PATENT DOCUMENTS

| | | | | |
|---|---|---|---|---|
| EP | 1383197 | A1 | | 1/2004 |
| JP | 03-214562 | A | | 9/1991 |
| JP | 03214562 | A | * | 9/1991 |
| JP | 05-182692 | | | 7/1993 |
| JP | 07006752 | A | * | 1/1995 |
| JP | 07-006752 | | | 10/1995 |
| JP | 09-129241 | A | | 5/1997 |
| JP | 11-185760 | | | 9/1999 |
| JP | 2000-323124 | A | | 11/2000 |
| JP | 2001-135305 | A | | 5/2001 |
| JP | 2005-268206 | A | | 9/2005 |
| JP | 2006-114228 | A | | 4/2006 |
| JP | 2006-134762 | A | | 5/2006 |
| JP | 2006-190691 | A | | 7/2006 |
| JP | 2006190691 | A | * | 7/2006 |
| JP | 2007-128660 | A | | 5/2007 |
| WO | 2002-071529 | A1 | | 9/2002 |
| WO | 2005-011043 | A1 | | 2/2005 |

OTHER PUBLICATIONS

Chinese Office Action issued in Chinese Patent Application No. CN 200880001225.1, dated Feb. 28, 2011.
Japanese Notice of Reasons for Rejection, with English translation thereof, issued in Japanese Patent Application No. JP 2007-323217 dated Nov. 10, 2009.
U.S. Final Office Action issued in U.S. Appl. No. 12/517,135, dated Mar. 27, 2014.
U.S. Office Action issued in U.S. Appl. No. 12/517,135, dated Oct. 25, 2013.
U.S. Final Office Action issued in U.S. Appl. No. 12/517,135, dated Aug. 6, 2012.
U.S. Office Action issued in U.S. Appl. No. 12/517,135, dated Feb. 17, 2012.

* cited by examiner

METHOD FOR FABRICATING A NONAQUEOUS ELECTROLYTE SECONDARY BATTERY

RELATED APPLICATIONS

This application is a divisional of U.S. patent application Ser. No. 12/517,135, filed on Jun. 1, 2009, which is a National Phase under 35 U.S.C. §371 of International Application No. PCT/JP2008/002114, filed on Aug. 5, 2008, which in turn claims the benefit of JP 2007-207594, filed on Aug. 9, 2007 and JP 2007-323217, filed Dec. 14, 2007, the disclosures of which Applications are incorporated by reference herein.

TECHNICAL FIELD

The present invention relates to nonaqueous electrolyte secondary batteries and methods for fabricating the batteries, and particularly relates to a nonaqueous electrolyte secondary battery capable of suppressing occurrence of short-circuit caused by crush and a method for fabricating such a battery.

BACKGROUND ART

To meet recent demands for use on vehicles in consideration of environmental issues or for employing DC power supplies for large tools, small and lightweight secondary batteries capable of performing rapid charge and large-current discharge have been required. Examples of typical batteries satisfying such demands include a nonaqueous electrolyte secondary battery employing, as a negative electrode material, an active material such as lithium metal or a lithium alloy or a lithium intercalation compound in which lithium ions are intercalated in carbon serving as a host substance (which is herein a substance capable of intercalating or deintercalating lithium ions), and also employing, as an electrolyte, an aprotic organic solvent in which lithium salt such as $LiClO_4$ or $LiPF_6$ is dissolved.

This nonaqueous electrolyte secondary battery generally includes: a negative electrode in which the negative electrode material described above is supported on a negative electrode current collector; a positive electrode in which a positive electrode active material, e.g., lithium cobalt composite oxide, electrochemically reacting with lithium ions reversibly is supported on a positive electrode current collector; and a porous insulating layer carrying an electrolyte thereon and interposed between the negative electrode and the positive electrode to prevent short-circuit from occurring between the negative electrode and the positive electrode.

The positive and negative electrodes formed in the form of sheet or foil are stacked, or wound in a spiral, with the porous insulating layer interposed therebetween to form a power generating element. This power generating element is placed in a battery case made of metal such as stainless steel, iron plated with nickel, or aluminium. Thereafter, the electrolyte is poured in the battery case, and then a lid is fixed to the opening end of the battery case to seal the battery case. In this manner, a nonaqueous electrolyte secondary battery is fabricated.

Patent Document 1: Japanese Unexamined Patent Publication No. 5-182692.

DISCLOSURE OF INVENTION

Problems that the Invention is to Solve

In general, occurrence of short-circuit in a nonaqueous electrolyte secondary battery (which may be hereinafter simply referred to as a "battery") causes large current to flow in the battery, resulting in a temperature rise in the battery. A rapid temperature rise in the battery might cause excessive heating of the battery. To prevent this, improvement in safety of the nonaqueous electrolyte secondary battery is required. In particular, for large-size and high-power nonaqueous electrolyte secondary batteries, excessive heating is highly likely to occur and, therefore, improvement in safety is strongly required.

Short-circuit in the nonaqueous electrolyte secondary battery occurs for some reasons including destruction of the battery by, for example, crush and entering of a foreign material in the battery. Among them, short-circuit caused by crushing of the battery in a fully-charged state produces high energy in the shortest instant, resulting in that excessive heating is most likely to occur. Actually, battery destruction might occur in some applications, and thus the presence of short-circuit caused by battery crush is an important factor for evaluating the safety.

In view of this, inventors of this disclosure intensively studied what causes short-circuit in a nonaqueous electrolyte secondary battery when the battery is destroyed by crush, to obtain the following finding.

In a situation where a nonaqueous electrolyte secondary battery is crushed to be deformed, each of a positive electrode, a negative electrode, and a porous insulating layer constituting an electrode group is subjected to tensile stress and extends according to the deformation of a battery case. When the battery is crushed to a given depth, the positive electrode having the lowest tensile extension percentage among the positive and negative electrodes and the porous insulating layer is broken first. Then, the broken portion of the positive electrode penetrates the porous insulating layer, resulting in that the positive electrode and the negative electrode are short-circuited. In other words, short-circuit occurs in the nonaqueous electrolyte secondary battery.

Based on the foregoing finding, the inventors concluded that it is necessary for suppression of short-circuit caused by crush to suppress first breakage of the positive electrode and that an increase in tensile extension percentage of the positive electrode is an important factor for the suppression of the first breakage.

In view of this, the inventors further intensively studied for means for increasing the tensile extension percentage of the positive electrode, to find that heat treatment performed at a given temperature in a given period of time after rolling can increase the tensile extension percentage of the positive electrode.

For heat treatment, disclosed is a technique of, for example, performing heat treatment on a positive electrode or a negative electrode at a temperature higher than the recrystallizing temperature of a binder and lower than the decomposition temperature of the binder before the positive and negative electrodes are stacked or wound with a porous insulating layer interposed therebetween, for the purpose of suppressing peeling of an electrode material from a current collector during the stacking or winding of the electrodes or suppressing a decrease in adhesiveness of the electrode material to the current collector (see Patent Document 1, for example)

In this technique, suppose a current collector based on aluminium such as JIS 1085 or 1N30 having high purity is used as a positive electrode current collector and, in the case of, for example, a nonaqueous electrolyte secondary battery employing PVDF as a binder contained in a positive electrode mixture layer (hereinafter, such a battery being referred to as a reference battery), the positive electrode is subjected to heat treatment at a high temperature for a long time after rolling. Then, although the tensile extension percentage of the positive electrode can be increased, a new problem, i.e., a decrease in capacity of the nonaqueous electrolyte secondary battery, arises. It should be noted that, in the case of using a current collector based on aluminium such as JIS 3003 containing copper as a positive electrode current collector, even subjecting the positive electrode to heat treatment after rolling cannot increase the tensile extension percentage of the positive electrode.

It is, therefore, an object of the present invention to increase the tensile extension percentage of a positive electrode without a decrease in capacity of a nonaqueous electrolyte secondary battery so that occurrence of short-circuit in the battery can be suppressed even upon destruction of the battery by crush.

Means of Solving the Problems

To achieve the object, a nonaqueous electrolyte secondary battery according to the present invention includes: a positive electrode including a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte. The positive electrode has a tensile extension percentage of equal to or higher than 3.0%. The positive electrode current collector is preferably made of aluminium containing iron.

In the nonaqueous electrolyte secondary battery, the tensile extension percentage of the positive electrode is increased to 3% or more. Accordingly, even when the battery is destroyed by crush, the positive electrode is not broken first, thus suppressing occurrence of short-circuit in the battery. As a result, the safety of the battery can be enhanced.

The use of a current collector made of iron-containing aluminium as the positive electrode current collector can suppress covering of the positive electrode active material with a melted binder, thus avoiding a decrease in battery capacity. Therefore, the resultant battery may exhibit excellent discharge performance.

Preferably, in the nonaqueous electrolyte secondary battery, the negative electrode has a tensile extension percentage of equal to or higher than 3.0%, and the porous insulating layer has a tensile extension percentage of equal to or higher than 3.0%.

In the nonaqueous electrolyte secondary battery, the tensile extension percentage of the positive electrode is preferably calculated from a length of a sample positive electrode formed out of the positive electrode and having a width of 15 mm and a length of 20 mm immediately before the sample positive electrode is broken with one end of the sample positive electrode fixed and the other end of the sample positive electrode extended along a longitudinal direction thereof at a speed of 20 mm/min, and from a length of the sample positive electrode before the sample positive electrode is extended.

Preferably, in the nonaqueous electrolyte secondary battery, the positive electrode current collector has a dynamic hardness of equal to or less than 70, and the positive electrode mixture layer has a dynamic hardness of equal to or less than 5.

Then, even when a foreign material enters an electrode group, the positive electrode is easily deformed according to the shape of the foreign material during charge or discharge, thus suppressing penetration of the foreign material into the separator. As a result, the safety of the battery can be further enhanced.

Preferably, in the nonaqueous electrolyte secondary battery, measurement of stress on a sample positive electrode whose circumferential surface is being pressed at a given speed shows that no inflection point of stress arises until a gap corresponding to the sample positive electrode crushed by the pressing reaches 3 mm, inclusive, and the sample positive electrode is formed out of the positive electrode, has a circumference of 100 mm, and is rolled up in the shape of a single complete circle. The given speed is preferably 10 mm/min Then, an electrode group can be formed by employing the positive electrode for which the sample positive electrode shows an inflection point of stress in a stiffness test with a gap of 3 mm or less. Accordingly, even when the positive electrode becomes thicker, breakage of the positive electrode during formation of the electrode group is suppressed. Thus, the resultant battery has high productivity.

In the nonaqueous electrolyte secondary battery, an amount of iron contained in the positive electrode current collector is preferably in the range from 1.20 wt % to 1.70 wt %, both inclusive.

In the nonaqueous electrolyte secondary battery, the binder is preferably one of poly vinylidene fluoride and a derivative of poly vinylidene fluoride.

In the nonaqueous electrolyte secondary battery, the binder is preferably a rubber-based binder.

In the nonaqueous electrolyte secondary battery, an amount of the binder contained in the positive electrode mixture layer is preferably in the range from 3.0 vol % to 6.0 vol %, both inclusive, with respect to 100.0 vol % of the positive electrode active material.

In the nonaqueous electrolyte secondary battery, the positive electrode active material preferably has an average particle diameter in the range from 5 μm to 20 μm, both inclusive.

To achieve the object described above, a method for fabricating a nonaqueous electrolyte secondary battery according to the present invention is a method for fabricating a nonaqueous electrolyte secondary battery including: a positive electrode including a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte. The method includes the steps of: (a) preparing the positive electrode; (b) preparing the negative electrode; (c) either winding or stacking the positive electrode and the negative electrode with the porous insulating layer interposed therebetween, after steps (a) and (b). In the method, step (a) includes the steps of: (a1) coating the positive electrode current collector with positive electrode material mixture slurry containing the positive electrode active material and the binder, and drying the slurry; (a2) rolling the positive electrode current collector coated with the dried positive electrode material mixture slurry, thereby forming the positive electrode having a given thickness; and (a3) performing heat treatment on the positive electrode at a given temperature, after step (a2). The positive electrode current collector is preferably made of aluminium containing iron. In addition, an amount of iron contained in the positive electrode current collector is preferably in the range from 1.20 wt % to 1.70 wt %, both inclusive.

In the method for fabricating a nonaqueous electrolyte secondary battery, the tensile extension percentage of the positive electrode can be increased to 3% or more in the heat treatment. In addition, the dynamic hardness of the positive electrode current collector can be reduced to 70 or less and the dynamic hardness of the positive electrode mixture layer can be reduced to 5 or less. Moreover, a sample positive electrode showing an inflection point of stress in a stiffness test with a gap of 3 mm or less can be provided.

The use of a current collector made of iron-containing aluminium as a positive electrode current collector can increase the tensile extension percentage of the positive electrode to 3% or more even when the heat treatment is performed at a lower temperature for a shorter period of time. Furthermore, the reductions in temperature and time of the heat treatment suppress covering of the positive electrode active material with the binder melted during the heat treatment. Accordingly, a decrease in battery capacity can be avoided.

In the method for fabricating a nonaqueous electrolyte secondary battery, the given temperature is preferably higher than a softening temperature of the positive electrode current collector.

In the method for fabricating a nonaqueous electrolyte secondary battery, the given temperature is preferably lower than a decomposition temperature of the binder.

In the method for fabricating a nonaqueous electrolyte secondary battery, an amount of the binder contained in the positive electrode material mixture slurry is preferably in the range from 3.0 vol % to 6.0 vol %, both inclusive, with respect to 100.0 vol % of the positive electrode active material.

In the method for fabricating a nonaqueous electrolyte secondary battery, in step (a3), the heat treatment is preferably performed on the positive electrode at the given temperature with hot air subjected to low humidity treatment.

Preferably, in the method for fabricating a nonaqueous electrolyte secondary battery, in step (a3), the given temperature is in the range from 250° C. to 350° C., both inclusive, and the heat treatment is performed in a period of time ranging from 10 seconds to 120 seconds, both inclusive.

Preferably, in the method for fabricating a nonaqueous electrolyte secondary battery, in step (a3), the given temperature is in the range from 220° C. to 250° C., both inclusive, and the heat treatment is performed in a period of time ranging from 2 minutes to 60 minutes, both inclusive.

Preferably, in the method for fabricating a nonaqueous electrolyte secondary battery, in step (a3), the given temperature is in the range from 160° C. to 220° C., both inclusive, and the heat treatment is performed in a period of time ranging from 60 minutes to 600 minutes, both inclusive.

In the method for fabricating a nonaqueous electrolyte secondary battery, in step (a3), the heat treatment is performed on the positive electrode by bringing a heated roll heated at the given temperature into contact with the positive electrode.

Then, the use of heat treatment with a heated roll allows reduction in time of the heat treatment, as compared to heat treatment with hot air. Accordingly, the productivity can be enhanced.

Preferably, in the method for fabricating a nonaqueous electrolyte secondary battery, in step (a3), the given temperature is 280° C., and the heat treatment is performed in a period of time equal to or less than 10 seconds.

Effects of the Invention

With a nonaqueous electrolyte secondary battery and a method for fabricating the battery according to the present invention, heat treatment performed at a low temperature for a short period of time after rolling can increase the tensile extension percentage of a positive electrode without a decrease in battery capacity. In addition, the hardness of the positive electrode can be reduced. The increase in tensile extension percentage of the positive electrode in this manner can suppress occurrence of short-circuit caused by crush. Further, the reduction in hardness of the positive electrode can suppress occurrence of short-circuit caused by entering of a foreign material and also suppress breakage of an electrode plate during formation of an electrode group. Accordingly, a nonaqueous electrolyte secondary battery excellent in discharge performance, safety, and productivity can be provided.

Figure 1:
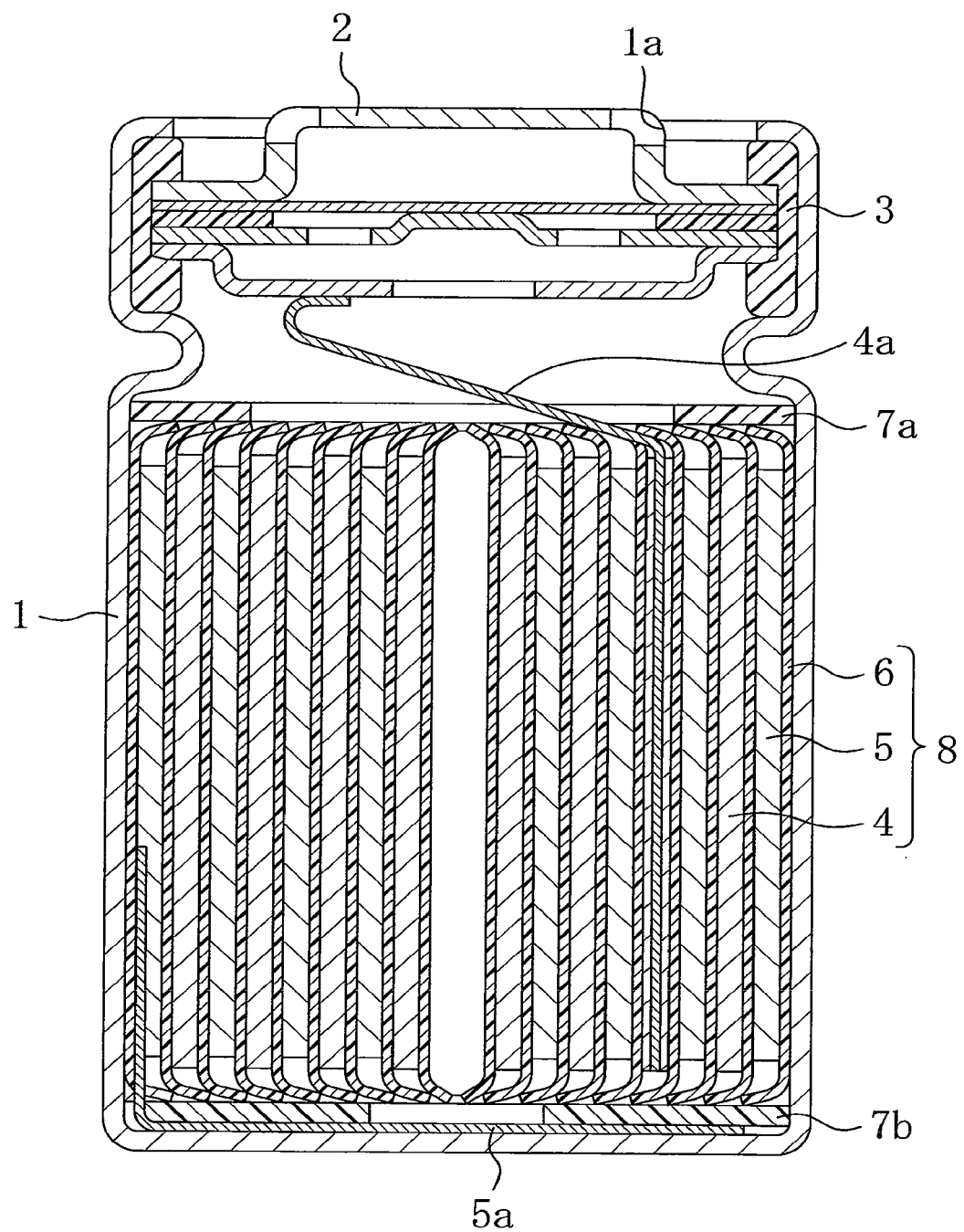
FIG. 1 is a vertical cross-sectional view illustrating a structure of a nonaqueous electrolyte secondary battery according to a first embodiment of the present invention.

DESCRIPTION OF NUMERALS 1 battery case
2 sealing plate
3 gasket
4 positive electrode
4a positive electrode lead
5 negative electrode
5a negative electrode lead
6 separator (porous insulating layer)
7a upper insulating plate
7b lower insulating plate
8 electrode group
4A positive electrode current collector
4B positive electrode mixture layer
5A negative electrode current collector
5B negative electrode mixture layer
9 positive electrode of the invention
9A positive electrode current collector
9B positive electrode mixture layer
10 crack
11 conventional positive electrode
11A positive electrode current collector
11B positive electrode mixture layer
12 crack
13 sample positive electrode
13a overlapping portion
14a upper flat plate
14b lower flat plate
15 gap
16a, 16b inflection point 17 nickel plate
18 nickel plate
19 sample positive electrode
20a upper chuck
20b lower chuck
21 base
a thickness
b length
c width
A thickness
C height

BEST MODE FOR CARRYING OUT THE INVENTION

Hereinafter, embodiments of the present invention will be described with reference to the drawings. The present invention is not limited to the following embodiments.

Embodiment 1

First, inventors of this disclosure examined the aforementioned new problem (i.e., a decrease in battery capacity) arising in a reference battery (specifically, a nonaqueous electrolyte secondary battery employing a current collector based on JIS 1085 or 1N30 as a positive electrode current collector and PVDF as a binder contained in a positive electrode mixture layer), to find that the problem is caused by covering of the positive electrode active material with the binder melted during heat treatment performed at a high temperature for a long period of time after rolling. However, in the reference battery, when the heat treatment was performed at a lower temperature for a shorter time, the battery capacity did not decrease, but the tensile extension percentage of the positive electrode could not be increased.

To solve this problem, the inventors further intensively studied for the structure of a positive electrode capable of increasing its tensile extension percentage even with heat treatment performed at a lower temperature for a shorter time after rolling, to find that the use of a current collector made of iron-containing aluminium (e.g., a current collector based on JIS 8000) as a positive electrode current collector can sufficiently increase the tensile extension percentage of the positive electrode even with the heat treatment performed at a lower temperature for a shorter time.

The increase in tensile extension percentage of the positive electrode is considered to be achieved because heat treatment performed on the positive electrode at a temperature higher than the softening temperature of the positive electrode current collector and lower than the decomposition temperature of the binder causes crystal forming the positive electrode current collector to grow and become coarse.

The reductions in temperature and time of the heat treatment are considered to be achieved because inclusion of iron in the positive electrode current collector accelerates the growth of crystal forming the positive electrode current collector.

Hereinafter, a lithium ion secondary battery will be described as a specific example of a nonaqueous electrolyte secondary battery according to a first embodiment of the present invention. A structure of the battery is described with reference to FIG. 1. FIG. 1 is a vertical cross-sectional view illustrating a structure of the nonaqueous electrolyte secondary battery of the first embodiment.

As illustrated in FIG. 1, the nonaqueous electrolyte secondary battery of this embodiment includes a battery case 1 made of, for example, stainless steel and an electrode group 8 placed in the battery case 1.

An opening 1a is formed in the upper face of the battery case 1. A sealing plate 2 is crimped to the opening 1a with a gasket 3 interposed therebetween, thereby sealing the opening 1a.

The electrode group 8 includes a positive electrode 4, a negative electrode 5, and a porous insulating layer (separator) 6 made of, for example, polyethylene. The positive electrode 4 and the negative electrode 5 are wound in a spiral with the separator 6 interposed therebetween. An upper insulating plate 7a is placed on top of the electrode group 8. A lower insulating plate 7b is placed on the bottom of the electrode group 8.

One end of a positive electrode lead 4a made of aluminium is attached to the positive electrode 4. The other end of the positive electrode lead 4a is attached to the sealing plate 2 also serving as a positive electrode terminal. One end of a negative electrode lead 5a made of nickel is attached to the negative electrode 5. The other end of the negative electrode lead 5a is connected to the battery case 1 also serving as a negative electrode terminal.

Figure 2:
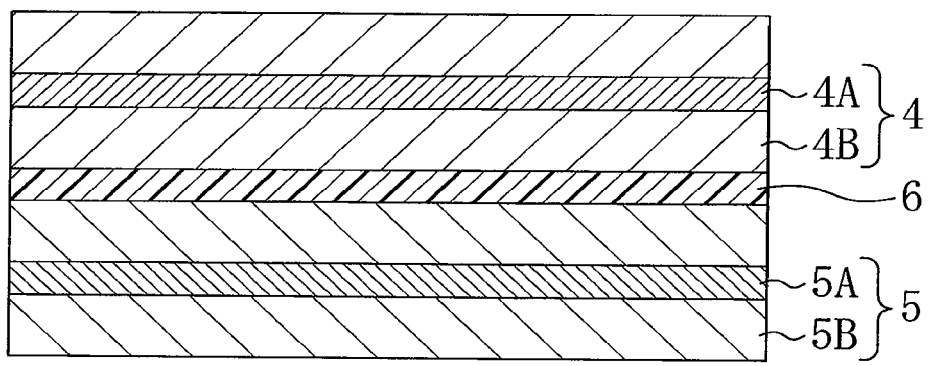
FIG. 2 is an enlarged cross-sectional view illustrating a structure of an electrode group.

A structure of the electrode group 8 of the nonaqueous electrolyte secondary battery of the first embodiment is now described with reference to FIG. 2. FIG. 2 is an enlarged cross-sectional view illustrating the structure of the electrode group 8.

As illustrated in FIG. 2, the positive electrode 4 includes a positive electrode current collector 4A and a positive electrode mixture layer 4B. The positive electrode current collector 4A is a conductive member in the shape of a plate, specifically is made of aluminium containing iron. The positive electrode mixture layer 4B is provided on the surface of the positive electrode current collector 4A, contains a positive electrode active material (e.g., lithium composite oxide), and preferably contains a binder or a conductive agent in addition to the positive electrode active material. The tensile extension percentage of the positive electrode 4 is 3% or more. In this manner, since the positive electrode 4 subjected to heat treatment after rolling is used in this embodiment, the tensile extension percentage of the positive electrode 4 is increased to 3% or more.

As illustrated in FIG. 2, the negative electrode 5 includes a negative electrode current collector 5A and a negative electrode mixture layer 5B. The negative electrode current collector 5A is a conductive member in the shape of a plate. The negative electrode mixture layer 5B is provided on the surface of the negative electrode current collector 5A, contains a negative electrode active material, and preferably contains a binder or a conductive agent in addition to the negative electrode active material. The tensile extension percentage of the negative electrode 5 is 3% or more. In general, the tensile extension percentage of a negative electrode using copper foil as a negative electrode current collector is in the range from 3% to 7%.

As illustrated in FIG. 2, the separator 6 is interposed between the positive electrode 4 and the negative electrode 5. The tensile extension percentage of the separator 6 is 3% or more. In general, the tensile extension percentage of a film separator mainly made of polyethylene is in the range from 8% to 12%.

The positive electrode according to this disclosure is a positive electrode in which a current collector of aluminium containing iron is employed as a positive electrode current collector and which has an increased tensile extension percentage of 3% or more due to heat treatment performed at a low temperature for a short time after rolling. The use of a current collector made of iron-containing aluminium as a positive electrode current collector in this manner can increase the tensile extension percentage of the positive electrode to 3% or more even with heat treatment performed at a lower temperature for a shorter time.

The positive electrode according to this disclosure, i.e., the positive electrode subjected to heat treatment after rolling, has a feature 1) of a tensile extension percentage of 3% or more. In addition, the positive electrode of this disclosure has two features 2) and 3) as follows:

2) The dynamic hardness of the positive electrode current collector constituting the positive electrode is 70 or less, and the dynamic hardness of the positive electrode mixture layer is 5 or less;

3) A gap at which an inflection point of stress is observed in a stiffness test is 3 mm or less.

Measurement methods A) through C) for the respective features 1) through 3) are now described.

A) Measurement of Tensile Extension Percentage

Figure 3A:
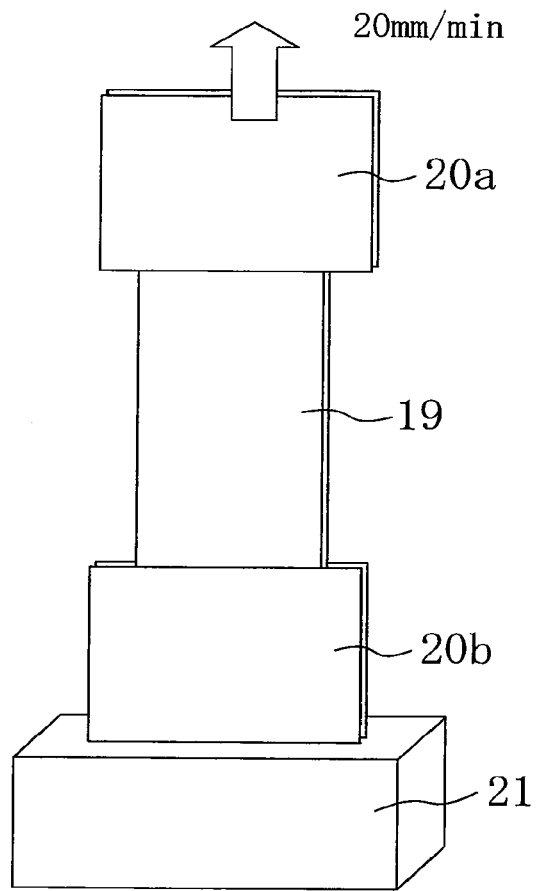
FIGS. 3(a) through 3(c) are views schematically showing measurement of a tensile extension percentage.

The "tensile extension percentage of a positive electrode" herein is measured as follows: First, a positive electrode is cut to have a width of 15 mm and an effective length (i.e., the length of an effective portion) of 20 mm, thereby forming a sample positive electrode 19 as illustrated in FIG. 3(a). Then, one end of the sample positive electrode 19 is placed on a lower chuck 20b supported by a base 21, whereas the other end of the sample positive electrode 19 is placed at an upper chuck 20a connected to a load mechanism (not shown) via a load cell (a load converter, not shown, for converting a load into an electrical signal), thereby holding the sample positive electrode 19. Subsequently, the upper chuck 20a is moved along the length of the sample positive electrode 19 at a speed of 20 mm/min to extend the sample positive electrode 19. At this time, the length of the sample positive electrode immediately before the sample positive electrode is broken is measured. Using the obtained length and the length (i.e., 20 mm) before the extension of the sample positive electrode 19, the tensile extension percentage of the positive electrode is calculated. The tensile load on the sample positive electrode 19 is detected from information obtained from the load cell.

Figure 3B:
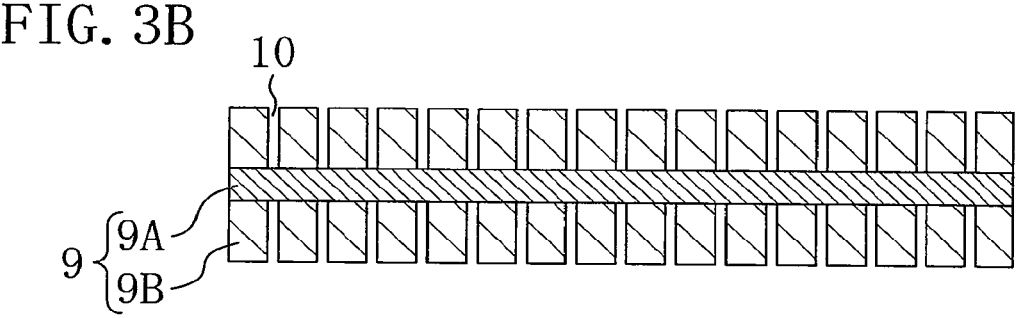

The definition of the "tensile extension percentage of the positive electrode" is now explained with reference to FIGS. 3(b) and (c). FIGS. 3(b) and (c) are cross-sectional views schematically illustrating the positive electrode in the measurement of the tensile extension percentage. Specifically, FIG. 3(b) shows the positive electrode of this disclosure and FIG. 3(c) shows a conventional positive electrode.

In measuring a positive electrode 9 according to this disclosure, the positive electrode current collector 9A extends first with fine cracks 10 occurring in the positive electrode mixture layer 9B as illustrated in FIG. 3(b) before the positive electrode current collector 9A is finally broken. In this manner, in the positive electrode 9 of this disclosure, a first crack occurs in the positive electrode mixture layer 9B and, for a short period of time after the first crack, the positive electrode current collector 9A is not broken, and continues to extend with cracks occurring in the positive electrode mixture layer 9B.

Figure 3C:
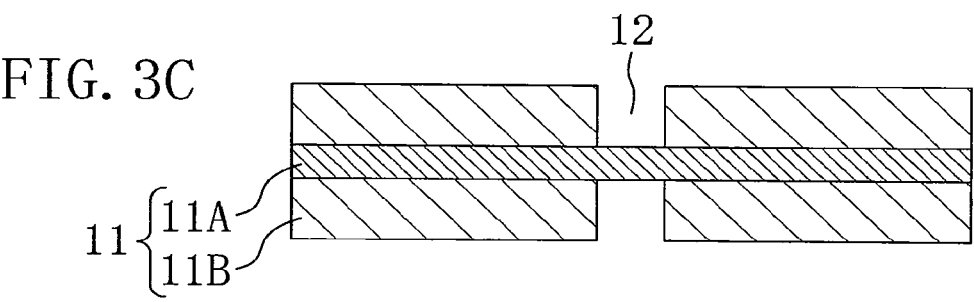

On the other hand, in measuring the tensile extension percentage of a conventional positive electrode (i.e., a positive electrode not subjected to heat treatment after rolling) 11, not fine cracks (see 10 in FIG. 3(b)) but a large crack 12 as shown in FIG. 3(c) occurs in a positive electrode mixture layer 11B, resulting in that a positive electrode current collector 11A is broken simultaneously with occurrence of the crack 12.

B) Measurement of Dynamic Hardness

The "dynamic hardness" herein is measured in the following manner: An indenter is pressed into the positive electrode under a given test pressure P (mN) so that the indent depth (the depth of penetration) D (μm) at this time can be measured. The obtained indent depth D is introduced to [Equation 1] below, thereby calculating a dynamic hardness DH. As the indenter, a Berkovich indenter (i.e., a three-sided pyramid indenter with a ridge angle of 115°) was used in this case.

$$DH = 3.8584 \times P/D^2 \quad \text{[Equation 1]}$$

As described above, the dynamic hardness herein is hardness calculated based on the indent depth of the indenter into a specimen and differs from, for example, Vickers hardness and Knoop hardness which are widely used for measuring the hardness of metals and for other purposes. Specifically, the dynamic hardness herein differs from hardness calculated based on the surface area of a bump formed by applying a test pressure to a specimen (e.g., a metal) and then removing the test pressure (where the surface area of the bump is calculated from the diagonal length of the bump).

C) Measurement in Stiffness Test

Figure 4A:
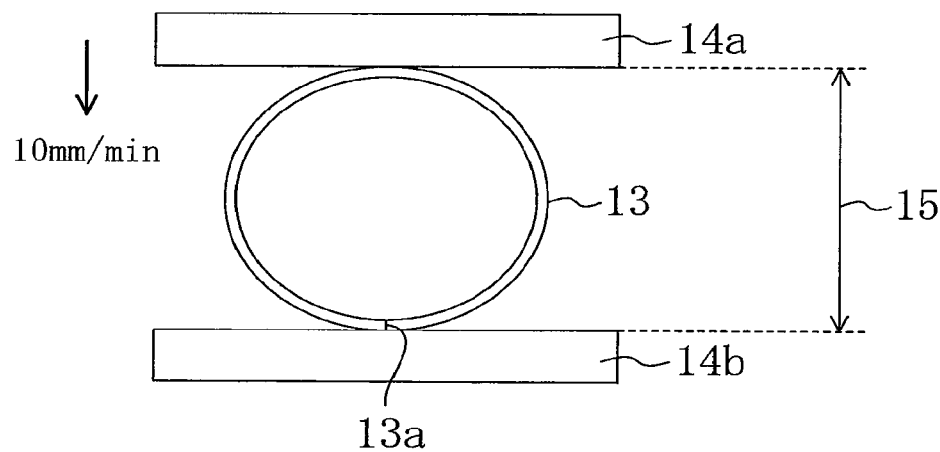
FIGS. 4(a) and 4(b) are views schematically showing a stiffness test.
Figure 4B:
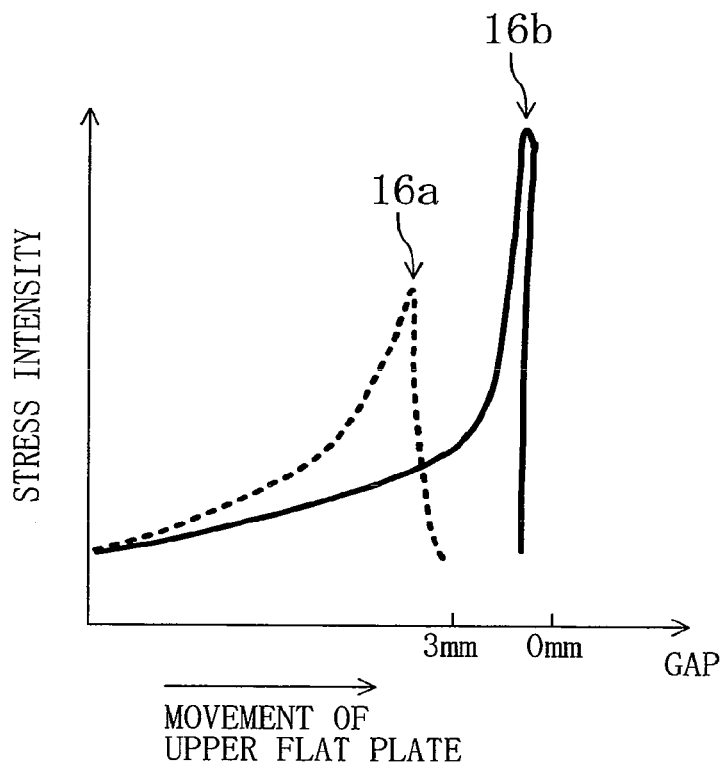

The "stiffness test" herein is a test in which the circumferential surface of a sample positive electrode having a circumference of 100 mm and rolled up in the shape of a single complete circle is pressed at a given speed. Specifically, a positive electrode is cut to have a width of 10 mm and a length of 100 mm, and the resultant electrode is rolled up to form a single complete circle with both ends thereof placed on top of each other (see an overlapping portion 13a in FIG. 4(a)), thereby completing a sample positive electrode 13 with a circumference of 100 mm. Then, as shown in FIG. 4(a), the overlapping portion 13a of the sample positive electrode 13 is fixed by a fixing jig (not shown) placed on a lower flat plate 14b, and the sample positive electrode 13 is sandwiched between an upper flat plate 14a and the lower flat plate 14b. Thereafter, the upper flat plate 14a is moved downward at a speed of 10 mm/min, thereby pressing the circumferential surface of the sample positive electrode 13. At this time, stress applied to the sample positive electrode 13 is measured, and the position of the downwardly-moved upper flat plate 14a at the time (see points 16a and 16b in FIG. 4(b)) when an inflection point of this stress is observed (i.e., when the sample positive electrode 13 cannot be deformed any more and is broken) is checked, thereby measuring a gap (i.e., a gap corresponding to the sample positive electrode 13) 15 between the upper flat plate 14a and the lower flat plate 14b. In FIG. 4(b), the solid line indicates the positive electrode of this disclosure (see battery 15 in Table 1 below), and the broken line indicates a positive electrode of a comparative example (see battery 24 in Table 1 below).

The stiffness test is performed in order to create indexes for easiness of deformation of the positive electrode. As the gap at which an inflection point of stress is observed decreases, the positive electrode is more easily deformed without breakage.

In this embodiment, the following advantages may be obtained.

As described for the feature 1), by increasing the tensile extension percentage of the positive electrode to 3% or more, the positive electrode is not broken first, and thus, short-circuit is not likely to occur in the battery even when the battery is destroyed by crush. Accordingly, the safety of the battery can be enhanced. The tensile extension percentages of the negative electrode and the separator also need to be 3% or more as the positive electrode because of the following reasons: First, a negative electrode having a tensile extension percentage less than 3% is broken first upon destruction of the battery by crush, and thus, short-circuit occurs in the battery even though the tensile extension percentages of the positive electrode and the separator are 3% or more, for example. Second, a separator having a tensile extension percentage less than 3% is broken first upon destruction of the battery by crush, and thus, short-circuit occurs in the battery even though the tensile extension percentages of the positive electrode and the negative electrode are 3% or more, for example. In view of this, the tensile extension percentage of each of the negative electrode and the separator is 3% or more in this embodiment.

In addition, the use of a current collector of iron-containing aluminium as a positive electrode current collector can increase the tensile extension percentage of the positive electrode to 3% or more even in a case where heat treatment is performed at a lower temperature for a shorter time. The reductions in temperature and time of the heat treatment suppress covering of the positive electrode active material with the binder melted during the heat treatment, and thus can avoid a decrease in battery capacity. As a result, a battery exhibiting excellent discharge performance may be provided.

In a case where a foreign material enters the electrode group of the battery, expansion or contraction of the positive and negative electrodes caused by charge or discharge makes the foreign material penetrate the separator during the charge or discharge, and short-circuit might occur in the battery consequently.

However, since the dynamic hardness of the positive electrode current collector is 70 or less and the dynamic hardness of the positive electrode mixture layer is 5 or less as described in 2), even in the case of entering of a foreign material in the electrode group, the positive electrode is easily deformed according to the shape of the foreign material. Accordingly, penetration of the foreign material can be suppressed. As a result, the safety of the battery can be further enhanced. In this manner, in addition to the advantage of suppression of short-circuit caused by crush, the advantage of suppression of short-circuit caused by entering of a foreign material can be obtained in this embodiment. Moreover, the following advantage can be obtained.

Specifically, as described in 3), the electrode group employs a positive electrode for which the gap at which an inflection point of stress is observed in a stiffness test is 3 mm or less. Accordingly, although the positive electrode may become thick, breakage of the positive electrode during formation of the electrode group can be suppressed. As a result, a battery exhibiting high productivity can be provided.

As described above, the positive electrode 4 of this embodiment is a positive electrode which employs, as the positive electrode current collector 4A, a current collector of iron-containing aluminium, and which has been subjected to heat treatment at a low temperature for a short time after rolling. The positive electrode 4 has the above-mentioned features 1), 2), and 3). Accordingly, the nonaqueous electrolyte secondary battery of this embodiment can exhibit the advantage of suppression of short-circuit caused by crush, the advantage of suppression of short-circuit caused by entering of a foreign material, and the advantage of suppression of breakage of the electrode plate during formation of the group, without a decrease in battery capacity.

The positive electrode 4, the negative electrode 5, the separator 6, and a nonaqueous electrolyte forming the nonaqueous electrolyte secondary battery of this embodiment are now described in detail.

First, the positive electrode is described in detail.

—Positive Electrode—

A positive electrode current collector 4A and a positive electrode mixture layer 4B constituting the positive electrode 4 are described in order.

The positive electrode current collector 4A uses a long conductor substrate having a porous or non-porous structure. The positive electrode current collector 4A is made of iron-containing aluminium. The iron content in the positive electrode current collector is preferably in the range from 1.20 wt % (weight %) to 1.70 wt %, both inclusive. The thickness of the positive electrode current collector 4A is not specifically limited, but is preferably in the range from 1 μm to 500 μm, both inclusive, and more preferably in the range from 10 μm to 20 μm, both inclusive. In this manner, the thickness of the positive electrode current collector 4A is set in the range described above, thus making it possible to reduce the weight of the positive electrode 4 while maintaining the strength of the positive electrode 4.

The positive electrode mixture layer 4B preferably contains a binder or a conductive agent, in addition to the positive electrode active material.

The positive electrode active material, the binder, and the conductive agent contained in the positive electrode mixture layer 4B are now described in order.

<Positive Electrode Active Material>

Examples of the positive electrode active material include $LiCoO_2$, $LiNiO_2$, $LiMnO_2$, $LiCoNiO_2$, $LiCoMO_z$, $LiNiMO_z$, $LiMn_2O_4$, $LiMnMO_4$, $LiMePO_4$, $Li_2MePO_4F$ (where M is at least one of Na, Mg, Sc, Y, Mn, Fe, Co, Ni, Cu, Zn, Al, Cr, Pb, Sb, and B). In these lithium-containing compounds, an element may be partially substituted with an element of a different type. In addition, the positive electrode active material may be a positive electrode active material subjected to a surface process using a metal oxide, a lithium oxide, or a conductive agent, for example. Examples of this surface process include hydrophobization.

The average particle diameter of the positive electrode active material is preferably in the range from 5 μm to 20 μm, both inclusive.

If the average particle diameter of the positive electrode active material is less than 5 μm, the positive electrode active material is greatly affected by heat treatment performed on the positive electrode, resulting in a rapid decrease in battery capacity (see battery 20 in Table 1 below). It was confirmed that the battery capacity decreases with a decrease in average particle diameter of the positive electrode active material (see batteries 20 to 22 in Table 1 below). This is considered to be because of the following reasons. Since the surface area of the positive electrode active material decreases with a decrease in average particle diameter of the positive electrode active material, the entire surface of the positive electrode active material is more likely to be covered with the binder melted during heat treatment after rolling. On the other hand, when the average particle diameter exceeds 20 μm, a coating streak is likely to occur during coating of the positive electrode current collector with positive electrode material mixture slurry. To prevent this, the average particle diameter of the positive electrode active material is preferably in the range from 5 μm to 20 μm, both inclusive.

<Binder>

Examples of the binder include poly vinylidene fluoride (PVDF), polytetrafluoroethylene, polyethylene, polypropylene, aramid resin, polyamide, polyimide, polyamide-imide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinyl pyrrolidone, polyether, polyether sulphone, hexafluoropolypropylene, styrene-butadiene rubber, and carboxymethyl cellulose. Examples of the binder also include a copolymer of two or more materials selected from the group consisting of tetrafluoroethylene, hexafluoroethylene, hexafluoropropylene, perfluoroalkylvinylether, vinylidene fluoride, chlorotrifluoroethylene, ethylene, propylene, pentafluoropropylene, fluoromethylvinylether, acrylic acid, and hexadiene, and a mixture of two or more materials selected from these materials.

Among the above-listed binders, PVDF and a derivative thereof are particularly chemically stable in a nonaqueous electrolyte secondary battery, and each sufficiently bonds the positive electrode mixture layer 4B and the positive electrode current collector 4A together, and also bonds the positive electrode active material, the binder, and the conductive agent constituting the positive electrode mixture layer 4B. Accordingly, excellent cycle characteristics and high discharge performance can be obtained. Thus, PVDF or a derivative thereof is preferably used as the binder of this disclosure. In addition, PVDF and a derivative thereof are available at low cost and, therefore, are preferable. To form a positive electrode employing PVDF as a binder, PVDF, for example, may be dissolved in N methylpyrrolidone, or PVDF powder may be dissolved in positive electrode material mixture slurry, for example, during the formation of the positive electrode.

In addition to PVDF and a derivative thereof, rubber-based binders (e.g., fluorocarbon rubber and acrylic rubber) are preferably used.

In general, rubber-based binders are chemically unstable in a nonaqueous electrolyte secondary battery as compared to PVDF and a derivative thereof, and are unsatisfactory in terms of cycle characteristics and discharge performance. However, the use of a rubber-based binder as a binder makes the tensile extension percentage of the positive electrode higher than that in the case of using PVDF and a derivative thereof as a binder (see batteries 15 to 19 in Table 1 below). Accordingly, short-circuit by crush can be effectively suppressed. Moreover, the dynamic hardness of the positive electrode mixture layer can be lower than that in the case of using PVDF and a derivative thereof as a binder (see batteries 15 to 19 in Table 1 below). Accordingly, short-circuit caused by entering of a foreign material can be effectively suppressed.

<Conductive Agent>

Examples of the conductive agent include graphites such as natural graphite and artificial graphite, carbon blacks such as acetylene black (AB), Ketjen black, channel black, furnace black, lamp black, and thermal black, conductive fibers such as carbon fiber and metal fiber, metal powders such as carbon fluoride and aluminium, conductive whiskers such as zinc oxide and potassium titanate, conductive metal oxides such as titanium oxide, and organic conductive materials such as a phenylene derivative.

Then, the negative electrode is described in detail.

—Negative Electrode—

A negative electrode current collector 5A and a negative electrode mixture layer 5B constituting the negative electrode 5 are now described in order.

As the negative electrode current collector 5A, a long conductive substrate having a porous or non-porous structure is used. The negative electrode current collector 5A is made of, for example, stainless steel, nickel, or copper. The thickness of the negative electrode current collector 5A is not specifically limited, but is preferably in the range from 1 μm to 500 μm, both inclusive, and more preferably in the range from 10 μm to 20 μm, both inclusive. In this manner, the thickness of the negative electrode current collector 5A is set in the range described above, thus making it possible to reduce the weight of the negative electrode 5 while maintaining the strength of the negative electrode 5.

The negative electrode mixture layer 5B preferably contains a binder or a conductive agent, in addition to the negative electrode active material.

The negative electrode active material contained in the negative electrode mixture layer 5B is now described.

<Negative Electrode Active Material>

Examples of the negative electrode active material include metal, metal fiber, a carbon material, oxide, nitride, a silicon compound, a tin compound, and various alloys. Examples of the carbon material include various natural graphites, coke, partially-graphitized carbon, carbon fiber, spherical carbon, various artificial graphites, and amorphous carbon.

Since simple substances such as silicon (Si) and tin (Sn), silicon compounds, and tin compounds have high capacitance density, it is preferable to use such materials as the negative electrode active material. Examples of the silicon compound include $SiO_x$ (where $0.05<x<1.95$) and a silicon alloy and a silicon solid solution obtained by substituting part of Si with at least one of the elements selected from the group consisting of B, Mg, Ni, Ti, Mo, Co, Ca, Cr, Cu, Fe, Mn, Nb, Ta, V, W, Zn, C, N, and Sn. Example of the tin compound include $Ni_2Sn_4$, $Mg_2Sn$, $SnO_x$ (where $0<x<2$), $SnO_2$, and $SnSiO_3$. One of the examples of the negative electrode active material may be used solely or two or more of them may be used in combination.

Then, the separator is described in detail.

—Separator—

Examples of the separator 6 interposed between the positive electrode 4 and the negative electrode 5 include a microporous thin film, woven fabric, and nonwoven fabric which have high ion permeability, a given mechanical strength, and a given insulation property. In particular, polyolefin such as polypropylene or polyethylene is preferably used as the separator 6. Since polyolefin has high durability and a shutdown function, the safety of the lithium ion secondary battery can be enhanced. The thickness of the separator 6 is generally in the range from 10 μm to 300 μm, both inclusive, and preferably in the range from 10 μm to 40 μm, both inclusive. The thickness of the separator 6 is more preferably in the range from 15 μm to 30 μm, both inclusive, and much more preferably in the range from 10 μm to 25 μm, both inclusive. In the case of using a microporous thin film as the separator 6, this microporous thin film may be a single-layer film made of a material of one type, or may be a composite film or a multilayer film made of one or more types of materials. The porosity of the separator 6 is preferably in the range from 30% to 70%, both inclusive, and more preferably in the range from 35% to 60%, both inclusive. The porosity herein is the volume ratio of pores to the total volume of the separator.

Then, the nonaqueous electrolyte is described in detail.

—Nonaqueous Electrolyte—

The nonaqueous electrolyte may be a liquid nonaqueous electrolyte, a gelled nonaqueous electrolyte, or a solid nonaqueous electrolyte.

The liquid nonaqueous electrolyte (i.e., the nonaqueous electrolyte) contains an electrolyte (e.g., lithium salt) and a nonaqueous solvent in which this electrolyte is to be dissolved.

The gelled nonaqueous electrolyte contains an nonaqueous electrolyte and a polymer material supporting the nonaqueous electrolyte. Examples of this polymer material include polyvinylidene fluoride, polyacrylonitrile, polyethylene oxide, polyvinyl chloride, polyacrylate, and polyvinylidene fluoride hexafluoropropylene.

The solid nonaqueous electrolyte contains a solid polymer electrolyte.

The nonaqueous electrolyte is now described in further detail.

As a nonaqueous solvent in which an electrolyte is to be dissolved, a known nonaqueous solvent may be used. The type of this nonaqueous solvent is not specifically limited, and examples of the nonaqueous solvent include cyclic carbonate, chain carbonate, and cyclic carboxylate. Cyclic carbonate may be propylene carbonate (PC) or ethylene carbonate (EC). Chain carbonate may be diethyl carbonate (DEC), ethylmethyl carbonate (EMC), or dimethyl carbonate (DMC). Cyclic carboxylate may be γ-butyrolactone (GBL) or γ-valerolactone (GVL). One of the examples of the nonaqueous solvent may be used solely or two or more of them may be used in combination.

Examples of the electrolyte to be dissolved in the nonaqueous solvent include $LiClO_4$, $LiBF_4$, $LiPF_6$, $LiAlCl_4$, $LiSbF_6$, LiSCN, $LiCF_3SO_3$, $LiCF_3CO_2$, $LiAsF_6$, $LiB_{10}Cl_{10}$, lower aliphatic lithium carboxylate, LiCl, LiBr, LiI, chloroborane lithium, borates, and imidates. Examples of the borates include bis(1,2-benzene diorate(2-)-O,O')lithium borate, bis(2,3-naphthalene diorate(2-)-O,O')lithium borate, bis(2,2'-biphenyl diorate(2-)-O,O')lithium borate, and bis(5-fluoro-2-orate-1-benzenesulfonic acid-O,O')lithium borate. Examples of the imidates include lithium bistrifluoromethanesulfonimide $((CF_3SO_2)_2NLi)$, lithium trifluoromethanesulfonate nonafluorobutanesulfonimide $(LiN(CF_3SO_2)(C_4F_9SO_2))$, and lithium bispentafluoroethanesulfonimide $((C_2F_5SO_2)_2NLi)$. One of these electrolytes may be used solely or two or more of them may be used in combination.

The amount of the electrolyte dissolved in the nonaqueous solvent is preferably in the range from 0.5 mol/m³ to 2 mol/m³, both inclusive.

The nonaqueous electrolyte may contain an additive which is decomposed on the negative electrode and forms thereon a coating having high lithium ion conductivity to enhance the charge-discharge efficiency, for example, in addition to the electrolyte and the nonaqueous solvent. Examples of the additive having such a function include vinylene carbonate (VC), 4-methylvinylene carbonate, 4,5-dimethylvinylene carbonate, 4-ethylvinylene carbonate, 4,5-diethylvinylene carbonate, 4-propylvinylene carbonate, 4,5-dipropylvinylene carbonate, 4-phenylvinylene carbonate, 4,5-diphenylvinylene carbonate, vinyl ethylene carbonate (VEC), and divinyl ethylene carbonate. One of the additives may be used solely or two or more of them may be used in combination. Among the additives, at least one selected from the group consisting of vinylene carbonate, vinyl ethylene carbonate, and divinyl ethylene carbonate is preferable. In the above-listed additives, hydrogen atoms may be partially substituted with fluorine atoms.

The nonaqueous electrolyte may further contain, for example, a known benzene derivative which is decomposed during overcharge and forms a coating on the electrode to inactivate the battery, in addition to the electrolyte and the nonaqueous solvent. The benzene derivative having such a function preferably includes a phenyl group and a cyclic compound group adjacent to the phenyl group. Examples of the benzene derivative include cyclohexylbenzene, biphenyl, and diphenyl ether. Examples of the cyclic compound group included in the benzene derivative include a phenyl group, a cyclic ether group, a cyclic ester group, a cycloalkyl group, and a phenoxy group. One of the benzene derivatives may be used solely or two or more of them may be used in combination. However, the content of the benzene derivative is preferably 10 vol % or less of the total volume of the nonaqueous solvent.

The structure of the nonaqueous electrolyte secondary battery of this embodiment is not limited to the structure illustrated in FIG. 1. For example, the nonaqueous electrolyte secondary battery of this embodiment is not limited to a cylindrical shape as shown in FIG. 1, and may be prism-shaped or a high-power lithium ion secondary battery. The structure of the electrode group 8 is not limited to the spiral provided by wounding the positive electrode 4 and the negative electrode 5 with the separator 6 interposed therebetween (see FIG. 1). Alternatively, the positive and negative electrodes may be stacked with the separator interposed therebetween.

Embodiment 2

Hereinafter, a method for fabricating a lithium ion secondary battery as an example of a nonaqueous electrolyte secondary battery according to a second embodiment of the present invention will be described with reference to FIG. 1.

Methods for forming a positive electrode 4, a negative electrode 5, and a battery are now described in order.

—Method for Forming Positive Electrode—

A positive electrode 4 is formed in the following manner: For example, a positive electrode active material, a binder (which is preferably made of PVDF or a derivative thereof or a rubber-based binder as described above), and a conductive agent are first mixed in a liquid component, thereby preparing positive electrode material mixture slurry. Then, this positive electrode material mixture slurry is applied onto the surface of a positive electrode current collector 4A made of iron-containing aluminium, and is dried. Thereafter, the resultant positive electrode current collector 4A is rolled, thereby forming a positive electrode having a given thickness. Subsequently, the positive electrode is subjected to heat treatment at a given temperature for a given period of time. The given temperature herein is higher than the softening temperature of the positive electrode current collector 4A and lower than the decomposition temperature of the binder.

The heat treatment performed on the positive electrode is carried out by using hot air subjected to low humidity treatment at a given temperature or by bringing a heated roll at a given temperature into contact with the positive electrode, for example.

The amount of the binder contained in the positive electrode material mixture slurry is preferably in the range from 3.0 vol % to 6.0 vol %, both inclusive, with respect to 100.0 vol % of the positive electrode active material. In other words, the amount of the binder contained in the positive electrode mixture layer is preferably in the range from 3.0 vol % to 6.0 vol %, both inclusive, with respect to 100.0 vol % of the positive electrode active material.

When the amount of the binder contained in the positive electrode material mixture slurry exceeds 6.0 vol %, the battery capacity rapidly decreases (see batteries 14 and 19 in Table 1 below). It was confirmed that when the amount of the binder contained in the positive electrode material mixture slurry is 3.0 vol % or more, the battery capacity decreases with an increase in amount of the binder (see batteries 12 to 14 and batteries 16 to 19 in Table 1 below). This is considered to be because of the following reasons. It is thought that with an increase in amount of the binder contained in the positive electrode material mixture slurry, the amount of the binder melted during heat treatment after rolling increases, and thus, the positive electrode active material is more likely to be covered with the melted binder. On the other hand, it was confirmed that when the amount was less than 3 vol %, the positive electrode mixture layer was easily peeled off from the positive electrode current collector, and thus, large degradation of the battery performance and a decrease in battery capacity were observed (see batteries 11 and 15 in Table 1 below). Accordingly, the amount of the binder contained in the positive electrode material mixture slurry is preferably in the range from 3 vol % to 6 vol %, both inclusive.

In performing heat treatment with hot air on a positive electrode employing a current collector made of iron-containing aluminium as a positive electrode current collector and PVDF or a derivative thereof as a binder, the following heat treatment conditions, for example, are preferable.

A first heat treatment condition is preferably that the given temperature is in the range from 250° C. to 350° C., both inclusive, and the heat treatment time is in the range from 10 seconds to 120 seconds, both inclusive, for example.

A second heat treatment condition is preferably that the given temperature is in the range from 220° C. to 250° C., both inclusive, and the heat treatment time is in the range from 2 minutes to 60 minutes, both inclusive, for example.

A third heat treatment condition is preferably that the given temperature is in the range from 160° C. to 220° C., both inclusive, and the heat treatment time is in the range from 60 minutes to 600 minutes, both inclusive, for example.

In the first through third heat treatment conditions, when the heat treatment time is shorter than the lower limit of the above-mentioned range (i.e., first heat treatment condition: 10 seconds, second heat treatment condition: 2 minutes, and third heat treatment condition: 60 minutes), it is difficult to increase the tensile extension percentage of the positive electrode to 3% or more. On the contrary, when the heat treatment time is longer than the upper limit of the above-mentioned range (i.e., first heat treatment condition: 120 seconds, second heat treatment condition: 60 minutes, and third heat treatment condition: 600 minutes) in the first through third heat treatment conditions, it is possible to increase the tensile extension percentage of the positive electrode to 3% or more, but a larger amount of the binder is melted during the heat treatment to cover the positive electrode active material. As a result, the battery capacity is likely to decrease.

In the case of performing heat treatment on the positive electrode by bringing a heated roll into contact with the positive electrode, the heat treatment time can be shorter than that in the case of performing heat treatment on the positive electrode with hot air. Accordingly, productivity can be enhanced.

To effectively increase the tensile extension percentage of the positive electrode subjected to heat treatment after rolling, the positive electrode may employ a positive electrode current collector having a relatively large thickness. Specifically, if a positive electrode current collector with a thickness of 15 µm (which is used for fabricating a commonly-used 18650-size lithium ion secondary battery) is used in forming a positive electrode, it is easy to increase the tensile extension percentage of the positive electrode to 3% or more, but it is relatively difficult to increase this percentage to 6% or more. On the other hand, if a positive electrode current collector with a thickness of 30 µm is used in forming a positive electrode, the tensile extension percentage of the positive electrode can be increased to as high as 13%.

—Method for Forming Negative Electrode—

A negative electrode 5 is formed in the following manner: For example, a negative electrode active material and a binder are first mixed in a liquid component, thereby preparing negative electrode material mixture slurry. Then, this negative electrode material mixture slurry is applied onto the surface of a negative electrode current collector 5A, and is dried. Thereafter, the resultant negative electrode current collector 5A is rolled up, thereby forming a negative electrode having a given thickness. After rolling, the negative electrode may be subjected to heat treatment at a given temperature for a given time.

<Method for Fabricating Battery>

A battery is fabricated in the following manner: For example, as illustrated in FIG. 1, an aluminium positive electrode lead 4a is attached to a positive electrode current collector (see 4A in FIG. 2), and a nickel negative electrode lead 5a is attached to a negative electrode current collector (see 5A in FIG. 2). Then, a positive electrode 4 and a negative electrode 5 are wound with a separator 6 interposed therebetween, thereby forming an electrode group 8. Thereafter, an upper insulating plate 7a is placed on the upper end of the electrode group 8, and a lower insulating plate 7b is placed on the lower end of the electrode group 8. Subsequently, the negative electrode lead 5a is welded to a battery case 1, and the positive electrode lead 4a is welded to a sealing plate 2 including a safety valve operated with inner pressure, thereby housing the electrode group 8 in the battery case 1. Then, a nonaqueous electrolyte is poured in the battery case 1 under a reduced pressure. Lastly, an opening end of the battery case 1 is crimped to the sealing plate 2 with a gasket 3 interposed therebetween, thereby completing a battery.

The method for fabricating a nonaqueous electrolyte secondary battery according to this embodiment has the following features:

First, heat treatment on the positive electrode is performed after rolling. This can increase the tensile extension percentage of the positive electrode to 3% or more. In addition, it is possible to reduce the hardness of the positive electrode (specifically, to reduce the dynamic hardness of the positive electrode current collector to 70 or less and the dynamic hardness of the positive electrode mixture layer to 5 or less). It is also possible to obtain a sample positive electrode which is not broken until the gap (see 15 in FIG. 4(a)) reaches 3 mm, inclusive, in a stiffness test.

Second, a current collector made of iron-containing aluminium is employed as the positive electrode current collector.

Third, in the case of employing a rubber-based binder as the binder, it is possible to effectively reduce the tensile extension percentage of the positive electrode, while effectively reducing the dynamic hardness of the positive electrode mixture layer.

It should be noted that heat treatment for increasing the tensile extension percentage of the positive electrode needs to be performed after rolling. If heat treatment is performed before rolling, the tensile extension percentage of the positive electrode can be increased during the heat treatment, but this percentage decreases during subsequent rolling. Consequently, the resultant tensile extension percentage of the positive electrode cannot be increased.

In this embodiment, heat treatment is performed on the positive electrode at a given temperature for a given time after rolling. This can increase the tensile extension percentage of the positive electrode to 3% or more. Accordingly, even when the battery is destroyed by crush, the positive electrode is not broken first, and thus, short-circuit is not likely to occur in the battery. As a result, the safety of the battery can be enhanced.

In addition, the current collector made of iron-containing aluminium is employed as the positive electrode current collector. Accordingly, it is possible to increase the tensile extension percentage of the positive electrode to 3% or more even with heat treatment performed at a lower temperature for a shorter time. As a result, no decrease in battery capacity can be avoided.

Moreover, the dynamic hardness of the positive electrode current collector is 70 or less, and the dynamic hardness of the positive electrode mixture layer is 5 or less. Accordingly, even with entering of a foreign material into the electrode group, the positive electrode is easily deformed according to the shape of the foreign material during charge or discharge, thus suppressing penetration of the foreign material into the separator. As a result, the safety of the battery may be further enhanced.

Furthermore, the electrode group is formed by using the positive electrode for which the gap where an inflection point of stress is observed in a stiffness test is 3 mm or less. Accordingly, breakage of the positive electrode in forming the electrode group can be suppressed even when the positive electrode becomes thicker.

As described above, heat treatment is performed on the positive electrode after rolling and before formation of the electrode group in this embodiment. This can suppress short-circuit caused by crush, short-circuit caused by entering of a foreign material, and breakage of the electrode plate in formation of the electrode group without a decrease in battery capacity.

To suppress short-circuit caused by crush, not only the tensile extension percentage of the positive electrode but also the tensile extension percentages of the negative electrode and the separator need to be 3% or more. In general, the separator has a tensile extension percentage of 3% or more, whereas the negative electrode does not have a tensile extension percentage of 3% or more in some cases, although having a tensile extension percentage of 3% or more in most cases. This embodiment, of course, employs a negative electrode having a tensile extension percentage of 3% or more. To ensure that the tensile extension percentage of the negative electrode is 3% or more, heat treatment may be performed on the negative electrode at a given temperature for a given time after rolling and before formation of the electrode group in forming the negative electrode. Then, the negative electrode has a tensile extension percentage of 3% or more without fail.

Although heat treatment performed on the negative electrode is not specifically described in this embodiment, the inventors intensively studied to fined the followings: First, in the case of using copper foil as the negative electrode current collector, heat treatment performed on the negative electrode at, for example, about 200° C. may increase the tensile extension percentage of the negative electrode. Second, in the case of using rolled-up copper foil as the negative electrode current collector, the tensile extension percentage of the negative electrode may be effectively increased, as compared to the case of using electrolytic copper foil.

Now, Example 1 (batteries 1 to 4), Example 2 (batteries 5 to 7), Example 3 (batteries 8 to 10), Example 4 (batteries 11 to 14), Example 5 (batteries 15 to 19), Example 6 (batteries 20 to 22), Example 7 (battery 23), and Comparative Example (batteries 24 and 25) are specifically described.

For the batteries 1 to 25, positive electrodes exhibiting different characteristics were obtained (see "tensile extension percentage of positive electrode", "dynamic hardness of current collector", and "dynamic hardness of mixture layer" in Table 1, and "gap in stiffness test").

In addition, for each of the batteries 1 to 25, short-circuit caused by crush (see "short-circuit depth" in Table 1), electrical performance (see "battery capacity" in Table 1), short-circuit caused by entering of a foreign material (see "short-circuit number" in Table 1), and breakage of the electrode plate during electrode group formation (see "breakage number" in Table 1) were evaluated.

Each of the batteries 1 to 25 employs a separator having a tensile extension percentage of 8% (i.e., 3% or more) and a negative electrode having a tensile extension percentage of 5% (i.e., 3% or more).

Example 1

In Example 1, batteries 1 to 4 were fabricated.

Each of the batteries 1 to 4 is characterized in that a current collector made of iron-containing aluminium was used as a positive electrode current collector, that PVDF was used as a binder, and that a positive electrode subjected to heat treatment with hot air at 280° C. for a given time (specifically, battery 1: 20 seconds, battery 2: 120 seconds, battery 3: 180 seconds, and battery 4: 10 seconds) was employed.

In this manner, the use of positive electrodes subjected to heat treatment at the same temperature for different times provided different characteristics of the positive electrodes in the batteries 1 to 4.

A method for fabricating a battery 1 is now specifically described.

(Battery 1)

(Formation of Positive Electrode)

First, $LiNi_{0.82}Co_{0.15}Al_{0.03}O_2$ having an average particle diameter of 10 μm was prepared.

Next, 4.5 vol % of acetylene black as a conductive agent with respect to 100.0 vol % of the positive electrode active material, a solution in which 4.7 vol % of polyvinylidene fluoride (PVDF) as a binder with respect to 100.0 vol % of the positive electrode active material was dissolved in a N-methyl pyrrolidone (NMP) solvent, and $LiNi_{0.82}Co_{0.15}Al_{0.03}O_2$ as the positive electrode active material were mixed, thereby obtaining positive electrode material mixture slurry. This positive electrode material mixture slurry was applied onto both surfaces of aluminium foil (A8021H-H18-15RK) produced by NIPPON FOIL MFG CO., LTD. and having a thickness of 15 μm as a positive electrode current collector, and was dried. Thereafter, the resultant positive electrode current collector whose both surfaces were coated with the dried positive electrode material mixture slurry was rolled, thereby obtaining a positive electrode plate in the shape of a plate having a thickness of 0.157 mm. This positive electrode plate was then subjected to heat treatment at 280° C. for 20 seconds by using hot air subjected to low humidity treatment at −30° C. Subsequently, the positive electrode plate was cut to have a width of 57 mm and a length of 564 mm, thereby obtaining a positive electrode having a thickness of 0.157 mm, a width of 57 mm, and a length of 564 mm.

(Formation of Negative Electrode)

First, 100 parts by weight of flake artificial graphite was ground and classified to have an average particle diameter of about 20 μm.

Then, 3 parts by weight of styrene butadiene rubber as a binder and 100 parts by weight of a solution containing 1 wt % of carboxymethyl cellulose as a binder were added to 100 parts by weight of flake artificial graphite as a negative electrode active material, and these materials were mixed, thereby preparing negative electrode material mixture slurry. This negative electrode material mixture slurry was then applied onto both surfaces of copper foil with a thickness of 8 μm as a negative electrode current collector, and was dried. Thereafter, the resultant negative electrode current collector whose both surfaces were coated with the dried negative electrode material mixture slurry was rolled up, thereby obtaining a negative electrode plate in the shape of a plate having a thickness of 0.156 mm. This negative electrode plate was subjected to heat treatment with hot air in a nitrogen atmosphere at 190° C. for 8 hours. The negative electrode plate was then cut to have a width of 58.5 mm and a length of 750 mm, thereby obtaining a negative electrode having a thickness of 0.156 mm, a width of 58.5 mm, and a length of 750 mm.

(Formation of Nonaqueous Electrolyte)

To a solvent mixture of ethylene carbonate and dimethyl carbonate in the volume ratio of 1:3 as a nonaqueous solvent, 5 wt % of vinylene carbonate was added as an additive for increasing the charge/discharge efficiency of the battery, and $LiPF_6$ as an electrolyte was dissolved in a mole concentration of 1.4 mol/m$^3$ with respect to the nonaqueous solvent, thereby obtaining a nonaqueous electrolyte solution.

(Formation of Cylindrical Battery)

First, a positive electrode lead made of aluminium was attached to the positive electrode current collector, and a negative electrode lead made of nickel was attached to the negative electrode current collector. Then, the positive electrode and the negative electrode were wound with a polyethylene separator interposed therebetween, thereby forming an electrode group. Thereafter, an upper insulating plate was placed at the upper end of the electrode group, and a lower insulating plate was placed at the bottom end of the electrode group. Subsequently, the negative electrode lead was welded to a battery case, and the positive electrode lead was welded to a sealing plate including a safety valve operated with inner pressure, thereby housing the electrode group in the battery case. Then, the nonaqueous electrolyte was poured in the battery case under reduced pressure. Lastly, an opening end of the battery case was crimped to the sealing plate with a gasket interposed therebetween.

The battery including the positive electrode subjected to heat treatment at 280° C. for 20 seconds in the foregoing manner is hereinafter referred to as the battery 1.

(Battery 2)

A battery 2 was fabricated in the same manner as for the battery 1 except for that the positive electrode plate of the battery 2 was subjected to heat treatment at 280° C. for 120 seconds in (Formation of Positive Electrode).

(Battery 3)

A battery 3 was fabricated in the same manner as for the battery 1 except for that the positive electrode plate of the battery 3 was subjected to heat treatment at 280° C. for 180 seconds in (Formation of Positive Electrode).

(Battery 4)

A battery 4 was fabricated in the same manner as for the battery 1 except for that the positive electrode plate of the battery 4 was subjected to heat treatment at 280° C. for 10 seconds in (Formation of Positive Electrode).

Example 2

In Example 2, batteries 5 to 7 were fabricated.

Each of the batteries 5 to 7 is characterized in that a current collector made of iron-containing aluminium was used as a positive electrode current collector, that PVDF was used as a binder, and that a positive electrode subjected to heat treatment with hot air at 230° C. for a given time (specifically, battery 5: 15 minutes, battery 6: 1 minute, and battery 7: 240 minutes).

(Battery 5)

A battery 5 was fabricated in the same manner as for the battery 1 except for that the positive electrode plate of the battery 5 was subjected to heat treatment at 230° C. for 15 minutes in (Fabrication of Positive Electrode).

(Battery 6)

A battery 6 was fabricated in the same manner as for the battery 1 except for that the positive electrode plate of the battery 6 was subjected to heat treatment at 230° C. for 1 minute in (Fabrication of Positive Electrode).

(Battery 7)

A battery 7 was fabricated in the same manner as for the battery 1 except for that the positive electrode plate of the battery 7 was subjected to heat treatment at 230° C. for 240 minutes in (Fabrication of Positive Electrode).

Example 3

In Example 3, batteries 8 to 10 were fabricated.

Each of the batteries 8 to 10 is characterized in that a current collector made of iron-containing aluminium was used as a positive electrode current collector, that PVDF was used as a binder, and that a positive electrode subjected to heat treatment with hot air at 180° C. for a given time (specifically, battery 8: 60 minutes, battery 9: 180 minutes, and battery 10: 1200 minutes).

(Battery 8)

A battery 8 was fabricated in the same manner as for the battery 1 except for that the positive electrode plate of the battery 8 was subjected to heat treatment at 180° C. for 60 minutes in (Fabrication of Positive Electrode).

(Battery 9)

A battery 9 was fabricated in the same manner as for the battery 1 except for that the positive electrode plate of the battery 9 was subjected to heat treatment at 180° C. for 180 minutes in (Fabrication of Positive Electrode).

(Battery 10)

A battery 10 was fabricated in the same manner as for the battery 1 except for that the positive electrode plate of the battery 10 was subjected to heat treatment at 180° C. for 1200 minutes in (Fabrication of Positive Electrode).

Example 4

In Example 4, batteries 11 to 14 were fabricated.

Each of the batteries 11 to 14 is characterized in that a current collector made of iron-containing aluminium was used as a positive electrode current collector, that a positive electrode subjected to heat treatment with hot air at 280° C. for 20 seconds was used, and that the amount of a binder (PVDF) contained in the positive electrode differs among the batteries.

The batteries of this example differ from the battery 1 in that positive electrode material mixture slurry in (Fabrication of Positive Electrode) contains 2.5 vol %, 3.0 vol %, 6.0 vol %, or 6.5 vol % of PVDF in the batteries of this example, but contains 4.7 vol % of PVDF in the battery 1, with respect to 100.0 vol % of the positive electrode active material.

(Battery 11)

A battery 11 was fabricated in the same manner as for the battery 1 except for that positive electrode material mixture slurry containing 2.5 vol % of PVDF with respect to 100.0 vol % of the positive electrode active material was used in (Fabrication of Positive Electrode).

(Battery 12)

A battery 12 was fabricated in the same manner as for the battery 1 except for that positive electrode material mixture slurry containing 3.0 vol % of PVDF with respect to 100.0 vol % of the positive electrode active material was used in (Fabrication of Positive Electrode).

(Battery 13)

A battery 13 was fabricated in the same manner as for the battery 1 except for that positive electrode material mixture slurry containing 6.0 vol % of PVDF with respect to 100.0 vol % of the positive electrode active material was used in (Fabrication of Positive Electrode).

(Battery 14)

A battery 14 was fabricated in the same manner as for the battery 1 except for that positive electrode material mixture slurry containing 6.5 vol % of PVDF with respect to 100.0 vol % of the positive electrode active material was used in (Fabrication of Positive Electrode).

Example 5

In Example 5, batteries 15 to 19 were fabricated.

Each of the batteries 15 to 19 is characterized in that a current collector made of iron-containing aluminium was used as a positive electrode current collector, that a positive electrode subjected to heat treatment with hot air at 280° C. for 20 seconds, that a PVDF was replaced by a rubber binder (BM500B produced by Zeon Corporation) as a binder, and that the amount of the binder (rubber binder) contained in the positive electrode differs among the batteries.

(Battery 15)

A battery 15 was fabricated in the same manner as for the battery 1 except for that a rubber binder was used instead of PVDF and that positive electrode material mixture slurry containing 2.5 vol % of the rubber binder with respect to 100.0 vol % of the positive electrode active material was used in (Fabrication of Positive Electrode).

(Battery 16)

A battery 16 was fabricated in the same manner as for the battery 1 except for that a rubber binder was used instead of PVDF and that positive electrode material mixture slurry containing 3.0 vol % of the rubber binder with respect to 100.0 vol % of the positive electrode active material was used in (Fabrication of Positive Electrode).

(Battery 17)

A battery 17 was fabricated in the same manner as for the battery 1 except for that a rubber binder was used instead of PVDF and that positive electrode material mixture slurry containing 4.5 vol % of the rubber binder with respect to 100.0 vol % of the positive electrode active material was used in (Fabrication of Positive Electrode).

(Battery 18)

A battery 18 was fabricated in the same manner as for the battery 1 except for that a rubber binder was used instead of PVDF and that positive electrode material mixture slurry containing 6.0 vol % of the rubber binder with respect to 100.0 vol % of the positive electrode active material was used in (Fabrication of Positive Electrode).

(Battery 19)

A battery 19 was fabricated in the same manner as for the battery 1 except for that a rubber binder was used instead of PVDF and that positive electrode material mixture slurry containing 6.5 vol % of the rubber binder with respect to 100.0 vol % of the positive electrode active material was used in (Fabrication of Positive Electrode).

Example 6

In Example 6, batteries 20 to 22 were fabricated.

Each of batteries 20 to 22 is characterized in that a current collector made of iron-containing aluminium was used as a positive electrode current collector, that PVDF was used as a binder, that a positive electrode subjected to heat treatment with hot air at 280° C. for 20 seconds was used, and that the average particle diameter of a positive electrode active material differs among the batteries (specifically battery 20: 1 μm, battery 21: 5 μm, and battery 22: 20 μm).

The batteries of this example differ from the battery 1 in that the average particle diameter of the positive electrode active material in (Fabrication of Positive Electrode) is 1 μm, 5 μm, or 20 μm in the batteries of this example, but is 10 μm in the battery 1.

(Battery 20)

A battery 20 was fabricated in the same manner as for the battery 1 except for that a positive electrode active material having an average particle diameter of 1 μm was used in (Fabrication of Positive Electrode).

(Battery 21)

A battery 21 was fabricated in the same manner as for the battery 1 except for that a positive electrode active material having an average particle diameter of 5 μm was used in (Fabrication of Positive Electrode).

(Battery 22)

A battery 22 was fabricated in the same manner as for the battery 1 except for that a positive electrode active material having an average particle diameter of 20 μm was used in (Fabrication of Positive Electrode).

Example 7

In Example 7, a battery 23 was fabricated.

The battery 23 is characterized in that a current collector made of iron-containing aluminium was used as a positive electrode current collector, that PVDF was used as a binder, and that a positive electrode subjected to heat treatment performed by using a heated roll, instead of hot air, after rolling was used.

(Battery 23)

A battery 23 was fabricated in the same manner as for the battery 1 except for that the heat treatment performed with hot air at 280° C. for 20 seconds was replaced by heat treatment with a heated roll in (Fabrication of Positive Electrode). The heat treatment with a heated roll is performed by bringing a heated roll at 280° C. into contact with the surface of the positive electrode plate for 2 seconds. In this manner, only by setting, at a short time (e.g., 2 seconds), the contact time (i.e., heat treatment time) during which the surface of the positive electrode plate is in contact with the heated roll, the surface temperature of the positive electrode plate can reach 250° C.

Comparative Example (Battery 24)
A battery 24 was fabricated in the same manner as for the battery 1 except for that no heat treatment was performed on a positive electrode plate after rolling in (Fabrication of Positive Electrode).

(Battery 25)
A battery 25 was fabricated in the same manner as for the battery 1 except for that no heat treatment was performed on a positive electrode plate after rolling using a rubber binder (BM500B produced by Zeon Corporation), instead of PVDF, as a binder in (Fabrication of Positive Electrode).

For each of the batteries 1 to 25, characteristics of the positive electrode were evaluated. The tensile extension percentage of the positive electrode, the dynamic hardness of the positive electrode current collector, the dynamic hardness of the positive electrode mixture layer, and a gap in the stiffness test were measured in order to evaluate characteristics of the positive electrode. The measurements were carried out in the following manner:

<Measurement of Tensile Extension Percentage of Positive Electrode>

First, each of the batteries 1 to 25 was charged to a voltage of 4.25 V at a constant current of 1.45 A, and was charged to a current of 50 mA at a constant voltage. Then, each of the resultant batteries 1 to 25 was disassembled, and a positive electrode was taken out. This positive electrode was then cut to have a width of 15 mm and an effective length of 20 mm, thereby forming a sample positive electrode. Thereafter, one end of the sample positive electrode was fixed, and the other end of the sample positive electrode was extended along the longitudinal direction thereof at a speed of 20 mm/min. At this time, the length of the sample positive electrode immediately before breakage was measured. Using the obtained length and the length (i.e., 20 mm) before the extension of the sample positive electrode, the tensile extension percentage of the positive electrode was calculated. The tensile extension percentages of the positive electrodes of the batteries 1 to 25 are shown in Table 1 below.

The tensile extension percentages of the negative electrode and the separator were also measured in the same manner as for measurement of the tensile extension percentage of the positive electrode.

Specifically, in <Measurement of Tensile Extension Percentage of Positive Electrode>, not only the positive electrode but also the negative electrode and the separator were taken out from each of the disassembled batteries 1 to 25 after charge. The negative electrode (or the separator) was then cut to have a width of 15 mm and an effective length of 20 mm. One end of the resultant negative electrode (or the separator) was fixed, and the other end of the negative electrode (or the separator) was extended along the longitudinal direction thereof at a speed of 20 mm/min. At this time, the length of the negative electrode (or the separator) immediately before breakage was measured. Using the obtained length and the length (i.e., 20 mm) before the extension of the negative electrode (or the separator), the tensile extension percentage of the negative electrode (or the separator) was calculated. Although the tensile extension percentages of the negative electrode and the separator of each of the batteries 1 to 25 are not shown in Table 1, the tensile extension percentage of the negative electrode is 5% and the tensile extension percentage of the separator is 8% in each of the batteries 1 to 25.

<Measurement of Dynamic Hardness>

First, each of the batteries 1 to 25 was charged to a voltage of 4.25 V at a constant current of 1.45 A, and was charged to a current of 50 mA at a constant voltage. Then, each of the resultant batteries 1 to 25 was disassembled, and a positive electrode was taken out. For this positive electrode, the dynamic hardness of the positive electrode current collector and the dynamic hardness of the positive electrode mixture layer were measured with Shimadzu Dynamic Ultra Micro Hardness Tester DUH-W201. The dynamic hardnesses of the current collector and the mixture layer of the positive electrode in each of the batteries 1 to 25 are shown in Table 1 below.

<Measurement of Stiffness Test>

First, each of the batteries 1 to 25 was charged to a voltage of 4.25 V at a constant current of 1.45 A, and was charged to a current of 50 mA at a constant voltage. Then, each of the resultant batteries 1 to 25 was disassembled, and a positive electrode was taken out. This positive electrode was cut to have a width of 10 mm and a length of 100 mm. The resultant positive electrode was rolled up to form a single complete circle with both ends thereof placed on top of each other, thereby forming a sample positive electrode (see 13 in FIG. 4(a)). The overlapping portion (i.e., 13a in FIG. 4(a)) of the sample positive electrode was fixed by a fixing jig placed on a lower flat plate (see 14b in FIG. 4(a)). Then, the sample positive electrode in the shape of a complete circle in cross section with a circumference of 100 mm was sandwiched between the lower flat plate and an upper flat plate (see 14a in FIG. 4(a)) placed above the lower flat plate. Thereafter, the upper flat plate was moved downward at a speed of 10 mm/min, thereby pressing the circumferential surface of the sample positive electrode. At this time, stress on the sample positive electrode varying according to the downward movement of the upper flat plate was measured, thereby detecting an inflection point of this stress. Then, the gap (i.e., see 15 in FIG. 4(a)) for the sample positive electrode at the time when the inflection point was detected was measured. The "inflection point of stress" herein means that the sample positive electrode which was being deformed by crush according to the movement of the upper flat plate could not be deformed any more and was broken. Results of the stiffness tests on the positive electrodes of the batteries 1 to 25 are shown in Table 1 below.

The battery capacity was measured for each of the batteries 1 to 25 in the following manner:

<Measurement of Battery Capacity>

Each of the batteries 1 to 25 was charged to a voltage of 4.2 V at a constant current of 1.4 A in an atmosphere of 25° C., and was charged to a current of 50 mA at a constant voltage of 4.2 V. Then, the battery was discharged to a voltage of 2.5 V at a constant current of 0.56 A, and the capacity of the battery at this time was measured.

For each of the batteries 1 to 25, a crush test, a foreign material entering test, and an electrode plate breakage evaluation were conducted.

<Crush Test>

First, each of the batteries 1 to 25 was charged to a voltage of 4.25 V at a constant current of 1.45 A, and was charged to a current of 50 mA at a constant voltage. Then, a round bar with a diameter of 6φ was brought into contact with each of the batteries 1 to 25 at a battery temperature of 30° C., and was moved in the depth direction of the battery at a speed of 0.1 mm/sec. In this manner, each of the batteries 1 to 25 was crushed. The amount of deformation of the battery along the depth thereof at the time of occurrence of short-circuit in the battery was measured with a displacement sensor. Results of the crush test on each of the batteries 1 to 25 are shown in Table 1 below.

<Foreign Substance Entering Test>

Figure 5A:
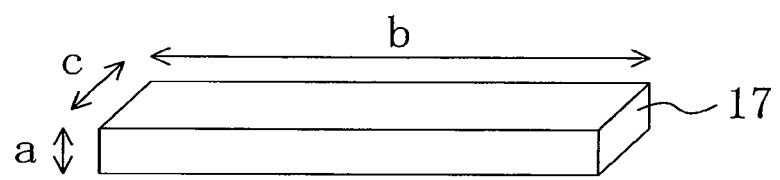
FIGS. 5(a) and 5(b) are views showing a foreign material entering test.
Figure 5B:
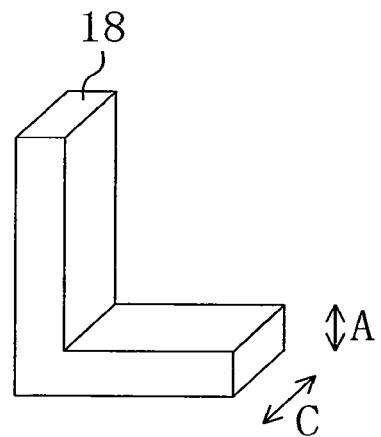

First, 20 cells of each of the batteries 1 to 25 were prepared. Then, each of the batteries 1 to 25 was charged to a voltage of 4.25 V at a constant current of 1.45 A, and was charged to a current of 50 mA at a constant voltage. Then, the electrode group was taken out from the battery case. Subsequently, a nickel plate 17 having a thickness of 0.1 mm (see a in FIG. 5(a)), a length of 2 mm (see b in FIG. 5(a)), and a width of 0.2 mm (see c in FIG. 5(a)) was bent at an arbitrary point on the length of 2 mm, thereby obtaining a nickel plate 18 in the shape of L in cross section having a thickness of 0.1 mm (see A in FIG. 5(b)) and a height of 0.2 mm (see C in FIG. 5(b)). This nickel plate 18 was interposed between the positive electrode and the separator at respective portions thereof closest to the circumference of the electrode group with the height direction of the nickel plate 18 oriented perpendicularly to the surfaces of the positive electrode and the separator (i.e., the thickness direction of the nickel plate 18 being in parallel with the surfaces of the positive electrode and the separator). This electrode group in which the nickel plate 18 was interposed between the positive electrode and the separator was then placed in the battery case again. Subsequently, each of the batteries 1 to 25 was pressed at a pressure of 800 N/cm². Then, out of the 20 cells, the number of cells showing occurrence of short-circuit was counted for each of the batteries 1 to 25. Results of the foreign material entering test on each of the batteries 1 to 25 are shown in Table 1 below.

<Electrode Plate Breakage Evaluation>

Using a winding core with a diameter of 3φ, the positive electrode and the negative electrode were wound with the separator interposed therebetween with a tension of 1.2 kg applied, thereby preparing 50 cells of each of the batteries 1 to 25. In each of the batteries 1 to 25, the number of broken positive electrodes among the 50 cells (i.e., the number of broken positive electrodes per 50 cells) was counted. Results of the electrode plate breakage evaluation on each of the batteries 1 to 25 are shown in Table 1 below.

The left part of Table 1 shows characteristics of the positive electrode of each of the batteries 1 to 25 (specifically, "tensile extension percentage of positive electrode", "dynamic hardness of current collector", "dynamic hardness of mixture layer", and "gap in stiffness test").

The right part of Table 1 shows the "battery capacities" of the batteries 1 to 25, the crush test results of the batteries 1 to 25 (see "short-circuit depth" in Table 1), the foreign material entering test results (see "short-circuit number" in Table 1), and the electrode plate breakage evaluation results (see "breakage number" in Table 1).

TABLE 1

| | TENSILE EXTENSION PERCENTAGE OF POSITIVE ELECTRODE [%] | DYNAMIC HARDNESS OF CURRENT COLLECTOR | DYNAMIC HARDNESS OF MIXTURE LAYER | GAP IN STIFFNESS TEST [mm] | BATTERY CAPACITY [Ah] | SHORT-CIRCUIT DEPTH [mm] | SHORT-CIRCUIT NUMBER | BREAKAGE NUMBER |
|---|---|---|---|---|---|---|---|---|
| BATTERY 1 | 5.0 | 60 | 4.7 | 2 | 2.90 | 9 | 1/20 | 0/50 |
| BATTERY 2 | 6.0 | 55 | 4.6 | 2 | 2.85 | 10 | 1/20 | 0/50 |
| BATTERY 3 | 6.5 | 53 | 4.5 | 2 | 2.60 | 10 | 1/20 | 0/50 |
| BATTERY 4 | 3.0 | 68 | 5.0 | 3 | 2.90 | 8 | 4/20 | 0/50 |
| BATTERY 5 | 6.0 | 55 | 4.6 | 2 | 2.90 | 10 | 1/20 | 0/50 |
| BATTERY 6 | 3.0 | 65 | 4.9 | 3 | 2.90 | 8 | 3/20 | 0/50 |
| BATTERY 7 | 6.5 | 55 | 5.0 | 2 | 2.60 | 10 | 1/20 | 0/50 |
| BATTERY 8 | 3.0 | 65 | 4.8 | 3 | 2.90 | 8 | 3/20 | 0/50 |
| BATTERY 9 | 5.0 | 56 | 4.4 | 2 | 2.85 | 9 | 1/20 | 0/50 |
| BATTERY 10 | 6.0 | 58 | 4.5 | 2 | 2.60 | 10 | 1/20 | 0/50 |
| BATTERY 11 | 6.0 | 55 | 4.4 | 2 | 2.70 | 10 | 1/20 | 0/50 |
| BATTERY 12 | 6.0 | 54 | 4.6 | 2 | 2.90 | 10 | 1/20 | 0/50 |
| BATTERY 13 | 6.0 | 52 | 4.2 | 2 | 2.85 | 10 | 1/20 | 0/50 |
| BATTERY 14 | 6.0 | 53 | 4.4 | 2 | 2.60 | 10 | 1/20 | 0/50 |
| BATTERY 15 | 6.5 | 53 | 1.2 | 1.5 | 2.70 | 10 | 0/20 | 0/50 |
| BATTERY 16 | 6.5 | 52 | 1.1 | 1.5 | 2.90 | 10 | 0/20 | 0/50 |
| BATTERY 17 | 6.5 | 53 | 1.0 | 1.5 | 2.90 | 10 | 0/20 | 0/50 |
| BATTERY 18 | 6.5 | 53 | 0.8 | 1.5 | 2.87 | 10 | 0/20 | 0/50 |
| BATTERY 19 | 6.5 | 58 | 0.7 | 1.5 | 2.65 | 10 | 0/20 | 0/50 |
| BATTERY 20 | 6.0 | 56 | 4.3 | 2 | 2.60 | 10 | 1/20 | 0/50 |
| BATTERY 21 | 6.0 | 56 | 4.3 | 2 | 2.85 | 10 | 1/20 | 0/50 |
| BATTERY 22 | 6.0 | 56 | 4.3 | 2 | 2.90 | 10 | 1/20 | 0/50 |
| BATTERY 23 | 6.0 | 56 | 4.4 | 2 | 2.90 | 10 | 1/20 | 0/50 |
| BATTERY 24 | 1.5 | 92 | 5.8 | 5 | 2.90 | 5 | 20/20 | 35/50 |
| BATTERY 25 | 1.5 | 93 | 1.8 | 4 | 2.90 | 5 | 8/20 | 25/50 |

The batteries 1 to 23 of Examples 1 to 7 and the batteries 24 and 25 of Comparative Example are now compared with each other based on Table 1. Each of the batteries 1 to 23 employs a positive electrode subjected to heat treatment after rolling, whereas each of the batteries 24 and 25 employs a positive electrode subjected to no heat treatment after rolling.

Table 1 shows that the tensile extension percentage of the positive electrode subjected to heat treatment after rolling is increased to 3% or more. Table 1 also shows that the batteries 1 to 23 employing positive electrodes whose tensile extension percentages are 3% or more can suppress short-circuit caused by crush.

In addition, Table 1 shows that in the positive electrode subjected to heat treatment after rolling, the dynamic hardness of the current collector is reduced to 70 or less and the dynamic hardness of the mixture layer is reduced to 5 or less. Table 1 also shows that the batteries 1 to 23 employing the positive electrodes in each of which the dynamic hardness of the current collector is 70 or less and the dynamic hardness of the mixture layer is 5 or less can suppress short-circuit caused by entering of a foreign material.

Moreover, Table 1 shows that in the positive electrode subjected to heat treatment after rolling, the gap in the stiffness test is reduced to 3 mm or less. Table 1 also shows that the batteries 1 to 23 employing the positive electrodes for each of which the gap is 3 mm or less can suppress electrode plate breakage during formation of the electrode group.

Examples 1 to 7 are now described in detail based on Table 1.

Example 1

The batteries 1 to 4 of Example 1 employ positive electrodes subjected to heat treatment with hot air at an identical temperature (specifically, 280° C.) for different heat treatment times (i.e., battery 1: 20 seconds, battery 2: 120 seconds, battery 3: 180 seconds, and battery 4: 10 seconds).

Table 1 shows that, with an increase in heat treatment time, the tensile extension percentage of the positive electrode increases, the dynamic hardness of the current collector decreases, the dynamic hardness of the mixture layer decreases, and the gap in the stiffness test decreases in the batteries 1 to 4. This demonstrates that characteristics of the positive electrode are affected by the time of heat treatment after rolling.

Table 1 also shows that, with an increase in heat treatment time, the short-circuit depth tends to increase and the number of batteries showing occurrence of short-circuit in the foreign material entering test tends to decrease in the batteries 1 to 4. This demonstrates that the batteries 1 to 4 effectively suppress short-circuit caused by crush and short-circuit caused by entering of a foreign material, with an increase in heat treatment time.

In the batteries 1 to 4, however, the battery capacity tends to decrease as the heat treatment time increases, as shown in Table 1. Therefore, it is important to define the upper limit of the heat treatment time.

It should be noted that the heat treatment time of the battery 3 is 180 seconds, i.e., longer than those of the batteries 1, 2, and 4 (specifically, battery 1: 20 seconds, battery 2: 120 seconds, battery 4: 10 seconds). In addition, the battery capacity of the battery 3 is smaller than those of the batteries 1, 2, and 4. In the case of the battery 3, since the heat treatment time after rolling is long as described above, the binder is melted during the heat treatment to cover the positive electrode active material, resulting in a decrease in battery capacity.

Accordingly, heat treatment at 280° C. is preferably performed for a heat treatment time less than 180 seconds (preferably, 120 seconds or less).

On the other hand, the heat treatment time of the battery 4 is 10 seconds, and is shorter than those of the batteries 1 and 2 (specifically, battery 1: 20 seconds, and battery 2: 120 seconds). In addition, the short-circuit depth of the battery 4 is smaller than those of the batteries 1 and 2, and the short-circuit number of the battery 4 is greater than those of the batteries 1 and 2. Since the heat treatment time after rolling for the battery 4 is shorter than those for the batteries 1 and 2 as described above, it is difficult to effectively suppress short-circuit caused by crush and short-circuit caused by entering of a foreign material in the case of the battery 4. The battery 4, of course, sufficiently suppresses short-circuit caused by crush and short-circuit caused by entering of a foreign material, as compared to the batteries 24 and 25.

Example 2

The batteries 5 to 7 of Example 2 employ positive electrodes subjected to heat treatment with hot air at an identical temperature (specifically, 230° C.) for different heat treatment times (i.e., battery 5: 15 minutes, battery 6: 1 minute, and battery 7: 240 minutes).

Table 1 shows that, with an increase in heat treatment time, the tensile extension percentage of the positive electrode increases and the gap in the stiffness test decreases in the batteries 5 to 7. This demonstrates that characteristics of the positive electrode are affected by heat treatment time after rolling.

Table 1 also shows that, with an increase in heat treatment time, the short-circuit depth tends to increase and the number of batteries showing occurrence of short-circuit in the foreign material entering test tends to decrease in the batteries 5 to 7. This demonstrates that the batteries 5 to 7 effectively suppresses short-circuit caused by crush and short-circuit caused by entering of a foreign material, with an increase in heat treatment time.

In the batteries 5 to 7, however, the battery capacity tends to decrease as the heat treatment time increases, as shown in Table 1. Therefore, it is important to define the upper limit of the heat treatment time.

It should be noted that the heat treatment time of the battery 7 is 240 minutes, i.e., longer than those of the batteries 5 and 6 (specifically, battery 5: 15 minutes and battery 6: 1 minute). In addition, the battery capacity of the battery 7 is lower than those of the batteries 5 and 6. In the case of the battery 7, since the heat treatment time after rolling is long as described above, the binder is melted during the heat treatment to cover the positive electrode active material, resulting in a decrease in battery capacity.

Accordingly, heat treatment at 230° C. is preferably performed for a heat treatment time less than 240 minutes (preferably, 60 minutes or less).

On the other hand, the heat treatment time of the battery 6 is 1 minute, i.e., shorter than that of the battery 5 (specifically, battery 5: 15 minutes). In addition, the short-circuit depth of the battery 6 is smaller than that of the battery 5 and, moreover, the short-circuit number of the battery 6 is greater than that of the battery 5. Since the heat treatment time after rolling for the battery 6 is short as described above, it is difficult for the battery 6 to sufficiently suppress short-circuit caused by crush and short-circuit caused by entering of a foreign material, as compared to the battery 5. The battery 6, of course, sufficiently suppresses short-circuit caused by crush and short-circuit caused by entering of a foreign material, as compared to the batteries 24 and 25.

Accordingly, heat treatment at 230° C. is preferably performed for a heat treatment time exceeding 1 minute (preferably, 2 minutes or more).

Example 3

The batteries 8 to 10 of Example 3 employ positive electrodes subjected to heat treatment with hot air at an identical temperature (specifically, 180° C.) for different heat treatment times (i.e., battery 8: 60 minutes, battery 9: 180 minutes, and battery 10: 1200 minutes).

Table 1 shows that, with an increase in heat treatment time, the tensile extension percentage of the positive electrode increases and the gap in the stiffness test decreases in the batteries 8 to 10. This demonstrates that characteristics of the positive electrode are affected by the heat treatment time after rolling.

Table 1 also shows that, with an increase in heat treatment time, the short-circuit depth tends to increase and the number of batteries showing occurrence of short-circuit in the foreign material entering test tends to decrease in the batteries 8 to 10. This demonstrates that the batteries 8 to 10 effectively suppress short-circuit caused by crush and short-circuit caused by entering of a foreign material, with an increase in heat treatment time.

In the batteries 8 to 10, however, the battery capacity tends to decrease as the heat treatment time increases, as shown in Table 1. Therefore, it is important to define the upper limit of the heat treatment time.

It should be noted that the heat treatment time of the battery 10 is 1200 minutes, and is longer than those of the batteries 8 and 9 (specifically, battery 8: 60 minutes and battery 9: 180 minutes). In addition, the battery capacity of the battery 10 is lower than those of the batteries 8 and 9. In the case of the battery 10, since the heat treatment time after rolling is long as described above, the binder is melted during the heat treatment to cover the positive electrode active material, resulting in a decrease in battery capacity.

Accordingly, heat treatment at 180° C. is preferably performed for a heat treatment time less than 1200 minutes (preferably, 600 minutes or less).

Example 4

The batteries 11 to 14 of Example 4 employ positive electrodes subjected to heat treatment with hot air at 280° C. for 20 seconds, and exhibit different amounts of binders (PVDF) contained in the positive electrodes. Specifically, the batteries 11 to 14 employ positive electrode material mixture slurry containing binders in different amounts (specifically, battery 11: 2.5 vol %, battery 12: 3.0 vol %, battery 13: 6.0 vol %, and battery 14: 6.5 vol %) in forming the positive electrodes.

Table 1 shows that no significant differences in characteristics of the positive electrode are observed among the batteries 11 to 14. This demonstrates that characteristics of the positive electrode are not greatly affected by the amount of the binder contained in the positive electrode.

In addition, no significant differences are found in the short-circuit depth, the short-circuit number, and the breakage number among the batteries 11 to 14. This demonstrates that the batteries 11 to 14 suppress short-circuit caused by crush, short-circuit caused by entering of a foreign material, and electrode plate breakage during formation of the electrode group, independently of the amount of the binder contained in the positive electrode.

On the other hand, in Table 1, a significant difference is observed in battery capacity among the batteries 11 to 14.

Specifically, in the batteries 12 to 14 fabricated using positive electrode material mixture slurry containing 3.0 vol % or more of a binder (specifically, battery 12: 3.0 vol %, battery 13: 6.0 vol %, and battery 14: 6.5 vol %), it was confirmed that the battery capacity decreases as the amount of the binder contained in the positive electrode increases. It was also confirmed that the battery capacity of the battery 14 is lower than those of the batteries 12 and 13.

From the above findings, it is estimated that, in the case of using positive electrode material mixture slurry containing more than 6 vol % of a binder in forming the positive electrode, a large amount of the binder is contained in the positive electrode, and thus, a large amount of the binder is melted during heat treatment to be likely to cover the positive electrode active material, thus causing a decrease in battery capacity.

Accordingly, the amount of the binder contained in the positive electrode material mixture slurry is preferably 6.0 vol % or less.

It was also confirmed that the battery 11 employing positive electrode material mixture slurry containing less than 3.0 vol % (i.e., 2.5 vol %) of a binder exhibits a lower battery capacity than those of the batteries 12 and 13.

From this finding, it is estimated that, in the case of using positive electrode material mixture slurry containing less than 3.0 vol % of a binder in forming the positive electrode, a small amount of the binder is contained in the positive electrode, and thus, the positive electrode mixture layer is likely to be peeled off from the positive electrode current collector, thus causing a decrease in battery capacity.

Accordingly, in fabricating the positive electrode, the amount of the binder (PVDF) contained in the positive electrode material mixture slurry is preferably in the range from 3.0 vol % to 6.0 vol %, both inclusive, with respect to 100.0 vol % of the positive electrode active material.

Example 5

The batteries 15 to 19 of Example 5 employ positive electrodes subjected to heat treatment with hot air at 280° C. for 20 seconds, and exhibit different amounts of binders (rubber binders) contained in the positive electrodes. Specifically, the batteries 15 to 19 employ positive electrode material mixture slurry containing binders in different amounts (specifically, battery 15: 2.5 vol %, battery 16: 3.0 vol %, battery 17: 4.5 vol %, battery 18: 6.0 vol %, and battery 19: 6.5 vol %) in forming the positive electrodes.

Table 1 shows that no significant differences are observed in characteristics (except for the dynamic hardness of the mixture layer) of the positive electrode among the batteries 15 to 19, and that the dynamic hardness of the mixture layer decreases as the amount of the binder (the rubber binder) contained in the positive electrode increases. This demonstrates that characteristics (except for the dynamic hardness of the mixture layer) of the positive electrode are not greatly affected by the amount of the binder contained in the positive electrode.

In addition, no significant differences are found in the short-circuit depth, the short-circuit number, and the breakage number among the batteries 15 to 19. This demonstrates that the batteries 15 to 19 suppress short-circuit caused by crush, short-circuit caused by entering of a foreign material, and electrode plate breakage during formation of the electrode group, independently of the amount of the binder contained in the positive electrode.

On the other hand, in Table 1, a significant difference is observed in battery capacity among the batteries 15 to 19.

Specifically, in the batteries 16 to 19 fabricated using positive electrode material mixture slurry containing 3.0 vol % or more of binders (specifically, battery 16: 3.0 vol %, battery 17: 4.5 vol %, battery 18: 6.0 vol %, and battery 19: 6.5 vol %), it was confirmed that the battery capacity decreases as the amount of the binder contained in the positive electrode increases. It was also confirmed that the battery capacity of the battery 19 is lower than those of the batteries 16 to 18.

From the above findings, it is estimated that, in the case of using positive electrode material mixture slurry containing more than 6 vol % of a binder during formation of the positive electrode, a large amount of the binder is contained in the positive electrode, and thus, a large amount of the binder is melted during heat treatment to be likely to cover the positive electrode active material, thus causing a decrease in battery capacity.

Accordingly, the amount of the binder contained in the positive electrode material mixture slurry is preferably 6.0 vol % or less.

It was also confirmed that the battery 15 employing positive electrode material mixture slurry containing less than 3.0 vol % (i.e., 2.5 vol %) of the binder exhibits a lower battery capacity than those of the batteries 16 to 18.

From this finding, it is estimated that, in the case of using positive electrode material mixture slurry containing less than 3.0 vol % of a binder during formation of the positive electrode, a small amount of the binder is contained in the positive electrode, and thus, the positive electrode mixture layer is likely to be peeled off from the positive electrode current collector, thus causing a decrease in battery capacity.

Accordingly, in fabricating the positive electrode, the amount of the binder (rubber binder) contained in the positive electrode material mixture slurry is preferably in the range from 3.0 vol % to 6.0 vol %, both inclusive, with respect to 100.0 vol % of the positive electrode active material.

Comparison between the batteries 11 to 14 of Example 3 and the batteries 15 to 19 of Example 4 shows that the short-circuit numbers of the batteries 15 to 19 are smaller than those of the batteries 11 to 14, as found in Table 1. This is considered to be because the use of a rubber binder as the binder in each of the batteries 15 to 19, instead of PVDF in the batteries 11 to 14, makes the dynamic hardness of the mixture layer lower than that in each of the batteries 11 to 14, and thus, the positive electrode is more easily deformed according to the shape of a foreign material.

Example 6

The batteries 20 to 22 of Example 6 employ positive electrodes subjected to heat treatment with hot air at 280° C. for 20 seconds, and exhibit different average particle diameters of the positive electrode active materials (specifically, battery 20: 1 µm, battery 21: 5 µm, and battery 22: 20 µm).

Table 1 shows that no significant differences are observed in characteristics of the positive electrode among the batteries 20 to 22. This demonstrates that characteristics of the positive electrode are not greatly affected by the average particle diameter of the positive electrode active material.

In addition, no significant differences are found in the short-circuit depth, the short-circuit number, and the breakage number among the batteries 20 to 22. This demonstrates that the batteries 20 to 22 suppress short-circuit caused by crush, short-circuit caused by entering of a foreign material, and electrode plate breakage during formation of the electrode group, independently of the average particle diameter of the positive electrode active material.

On the other hand, Table 1 shows that the battery capacity decreases as the average particle diameter of the positive electrode active material decreases in the batteries 20 to 22. Table 1 also shows that the battery capacity of the battery 20 is lower than those of the batteries 21 and 22.

From the foregoing findings, it is estimated that, in the case of using a positive electrode active material having an average particle diameter of 1 µm (i.e., less than 5 µm), the positive electrode active material is small in size and, therefore, has a small surface area, and thus, a binder melted during heat treatment is more likely to cover the entire surface of the positive electrode active material to cause a decrease in battery capacity. When the binder melted during heat treatment does not cover the entire surface of the positive electrode active material, but covers only a portion of the surface of the positive electrode active material, the battery capacity does not decrease.

In the case of using a positive electrode active material having an average particle diameter exceeding 20 µm, the positive electrode active material is large, resulting in that coating streak occurs during coating the positive electrode current collector with the positive electrode material mixture slurry.

Accordingly, the average particle diameter of the positive electrode active material is preferably in the range from 5 µm to 20 µm, both inclusive.

Example 7

The battery 23 of Example 7 employs a positive electrode subjected to heat treatment with a heated roll, instead of heat treatment with hot air.

Table 1 shows that the tensile extension percentage of the positive electrode is 3% or more, the dynamic hardness of the current collector is 70 or less, the dynamic hardness of the mixture layer is 5 or less, and the gap in the stiffness test is 3 mm or less in the battery 23. In this manner, the positive electrode subjected to heat treatment with a heated roll exhibits similar characteristics to those of the positive electrodes subjected to heat treatment with hot air.

From the above finding, it is confirmed that the battery 23 suppresses short-circuit caused by crush, short-circuit caused by entering of a foreign material, and electrode plate breakage during formation of the electrode group without a decrease in battery capacity, as shown in Table 1.

In the battery 23, although the time of contact with the heated roll (i.e., the heat treatment time with the heated roll) is shorter (e.g., 2 seconds) than that of the heat treatment time with hot air, similar characteristics to those of the positive electrodes subjected to heat treatment with hot air are exhibited.

From the above fact, heat treatment with a heated roll allows reduction of the heat treatment time, as compared to heat treatment with hot air.

Accordingly, the heat treatment employing a heated roll at 280° C. provides sufficient advantages even if the heat treatment time (i.e., the time of contact with the heated roll) is 10 seconds or less.

It is noted that the battery 25 of Comparative Example employs a rubber binder as the binder, and thus shows a lower dynamic hardness of the mixture layer than that of the battery 24 employing PVDF as the binder, resulting in that the short-circuit number and the breakage number are smaller than those of the battery 24.

INDUSTRIAL APPLICABILITY

As described above, the present invention may be useful for devices such as household power supplies with, for example, higher energy density, power supplies to be installed in vehicles, and power supplies for large tools.

The invention claimed is:

1. A method for fabricating a nonaqueous electrolyte secondary battery including: a positive electrode including a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte, the method comprising the steps of:
   (a) preparing the positive electrode;
   (b) preparing the negative electrode;
   (c) either winding or stacking the positive electrode and the negative electrode with the porous insulating layer interposed therebetween, after steps (a) and (b), wherein
   step (a) includes the steps of:
      (a1) coating the positive electrode current collector with positive electrode material mixture slurry containing the positive electrode active material and the binder, and drying the slurry;
      (a2) rolling the positive electrode current collector coated with the dried positive electrode material mixture slurry, thereby forming the positive electrode having a given thickness; and
      (a3) performing heat treatment on the positive electrode at a given temperature, after step (a2), with hot air subjected to low humidity treatment, wherein
   in step (a3), the given temperature is in the range from 250° C. to 350° C., both inclusive, and the heat treatment is performed in a period of time ranging from 10 seconds to 120 seconds, both inclusive.

2. The method of claim 1, wherein the given temperature is lower than a decomposition temperature of the binder.

3. The method of claim 1, wherein an amount of the binder contained in the positive electrode material mixture slurry is in the range from 3.0 vol % to 6.0 vol %, both inclusive, with respect to 100.0 vol % of the positive electrode active material.

4. A method for fabricating a nonaqueous electrolyte secondary battery including: a positive electrode including: a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte, the method comprising the steps of:
   (a) preparing the positive electrode;
   (b) preparing the negative electrode;
   (c) either winding or stacking the positive electrode and the negative electrode with the porous insulating layer interposed therebetween, after steps (a) and (b), wherein
   step (a) includes the steps of:
      (a1) coating the positive electrode current collector with positive electrode material mixture slurry containing the positive electrode active material and the binder, and drying the slurry;
      (a2) rolling the positive electrode current collector coated with the dried positive electrode material mixture slurry, thereby forming the positive electrode having a given thickness; and
      (a3) performing heat treatment on the positive electrode after step (a2) by bringing a heated roll heated at the given temperature into contact with the positive electrode,
   wherein in step (a3), the given temperature is 280° C., and the heat treatment is performed in a period of time equal to or less than 10 seconds.

5. A method for fabricating a nonaqueous electrolyte secondary battery including: a positive electrode including: a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte, the method comprising the steps of:
   (a) preparing the positive electrode;
   (b) preparing the negative electrode;
   (c) either winding or stacking the positive electrode and the negative electrode with the porous insulating layer interposed therebetween, after steps (a) and (b), wherein
   step (a) includes the steps of:
      (a1) coating the positive electrode current collector with positive electrode material mixture slurry containing the positive electrode active material and the binder, and drying the slurry;
      (a2) rolling the positive electrode current collector coated with the dried positive electrode material mixture slurry, thereby forming the positive electrode having a given thickness; and
      (a3) performing heat treatment on the positive electrode after step (a2) by bringing a heated roll heated at the given temperature into contact with the positive electrode,
   wherein in step (a3), the given temperature is in the range from 250° C. to 350° C., both inclusive, and
   the heat treatment is performed in a period of time which is less than 10 seconds.

6. A method for fabricating a nonaqueous electrolyte secondary battery including: a positive electrode including: a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte, the method comprising the steps of:
   (a) preparing the positive electrode;
   (b) preparing the negative electrode;
   (c) either winding or stacking the positive electrode and the negative electrode with the porous insulating layer interposed therebetween, after steps (a) and (b), wherein
   step (a) includes the steps of:
      (a1) coating the positive electrode current collector with positive electrode material mixture slurry containing the positive electrode active material and the binder, and drying the slurry;
      (a2) rolling the positive electrode current collector coated with the dried positive electrode material mixture slurry, thereby forming the positive electrode having a given thickness; and
      (a3) performing heat treatment on the positive electrode after step (a2) by bringing a heated roll heated at the given temperature into contact with the positive electrode,
   wherein in step (a3), the given temperature is in the range from 220° C. to 250° C., both inclusive, and
   the heat treatment is performed in a period of time which is less than 2 minutes.

7. A method for fabricating a nonaqueous electrolyte secondary battery including: a positive electrode including: a positive electrode current collector and a positive electrode mixture layer containing a positive electrode active material and a binder, the positive electrode mixture layer being provided on the positive electrode current collector; a negative electrode; a porous insulating layer interposed between the positive electrode and the negative electrode; and a nonaqueous electrolyte, the method comprising the steps of:

(a) preparing the positive electrode;
(b) preparing the negative electrode;
(c) either winding or stacking the positive electrode and the negative electrode with the porous insulating layer interposed therebetween, after steps (a) and (b), wherein step (a) includes the steps of:

(a1) coating the positive electrode current collector with positive electrode material mixture slurry containing the positive electrode active material and the binder, and drying the slurry;

(a2) rolling the positive electrode current collector coated with the dried positive electrode material mixture slurry, thereby forming the positive electrode having a given thickness; and (a3) performing heat treatment on the positive electrode after step (a2) by bringing a heated roll heated at the given temperature into contact with the positive electrode, wherein in step (a3), the given temperature is in the range from 160° C. to 220° C., both inclusive, and
the heat treatment is performed in a period of time that is less than 60 minutes, both inclusive.

8. The method of claim 1, wherein
the positive electrode current collector is made of aluminum containing iron, and
an amount of iron contained in the positive electrode current collector is in the range from 1.20 wt % to 1.70 wt %, both inclusive.

9. The method of claim 4, wherein an amount of the binder contained in the positive electrode material mixture slurry is in the range from 3.0 vol % to 6.0 vol %, both inclusive, with respect to 100.0 vol % of the positive electrode active material.

10. The method of claim 4, wherein
the positive electrode current collector is made of aluminium containing iron, and
an amount of iron contained in the positive electrode current collector is in the range from 1.20 wt % to 1.70 wt %, both inclusive.

11. The method of claim 5, wherein an amount of the binder contained in the positive electrode material mixture slurry is in the range from 3.0 vol % to 6.0 vol %, both inclusive, with respect to 100.0 vol % of the positive electrode active material.

12. The method of claim 5, wherein
the positive electrode current collector is made of aluminium containing iron, and
an amount of iron contained in the positive electrode current collector is in the range from 1.20 wt % to 1.70 wt %, both inclusive.

13. The method of claim 6, wherein an amount of the binder contained in the positive electrode material mixture slurry is in the range from 3.0 vol % to 6.0 vol %, both inclusive, with respect to 100.0 vol % of the positive electrode active material.

14. The method of claim 6, wherein
the positive electrode current collector is made of aluminium containing iron, and
an amount of iron contained in the positive electrode current collector is in the range from 1.20 wt % to 1.70 wt %, both inclusive.

15. The method of claim 7, wherein an amount of the binder contained in the positive electrode material mixture slurry is in the range from 3.0 vol % to 6.0 vol %, both inclusive, with respect to 100.0 vol % of the positive electrode active material.

16. The method of claim 7, wherein
the positive electrode current collector is made of aluminium containing iron, and
an amount of iron contained in the positive electrode current collector is in the range from 1.20 wt % to 1.70 wt %, both inclusive.

* * * * *